United States Patent
Ohkawa et al.

(10) Patent No.: US 6,469,294 B2
(45) Date of Patent: *Oct. 22, 2002

(54) OPTICAL SCANNER AND LIGHT SOURCE MODULE WITH REDUCED LIGHT BEAM DIAMETER

(75) Inventors: Masanori Ohkawa; Toshiyuki Ichikawa; Hiroshi Watanuki; Kozo Yamazaki, all of Kawasaki (JP)

(73) Assignee: Fujitsu Limited, Kawasaki (JP)

( * ) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 09/045,044

(22) Filed: Mar. 20, 1998

(65) Prior Publication Data

US 2001/0019104 A1 Sep. 6, 2001

(30) Foreign Application Priority Data

Aug. 1, 1997 (JP) ............................................. 9-208137

(51) Int. Cl.⁷ .................................................. H01J 3/14
(52) U.S. Cl. ...................... 250/235; 250/208.1; 250/566
(58) Field of Search ................................. 250/234, 235, 250/566, 216, 208.1; 359/216, 220, 221; 358/474; 382/313; 235/467, 462.39, 462.43, 462.44

(56) References Cited

U.S. PATENT DOCUMENTS

| | | | |
|---|---|---|---|
| 5,194,981 A | * 3/1993 | Morimoto | 359/212 |
| 5,369,284 A | * 11/1994 | Bellio | 250/559.36 |
| 5,506,392 A | 4/1996 | Barkan et al. | 235/472 |
| 5,801,370 A | * 9/1998 | Katoh et al. | 235/467 |
| 5,936,218 A | 8/1999 | Ohkawa et al. | 235/162.39 |

FOREIGN PATENT DOCUMENTS

| | | |
|---|---|---|
| EP | 0691622 A | 1/1996 |
| EP | 0752680 A | 1/1997 |
| JP | 9-167198 | 9/1997 |

* cited by examiner

*Primary Examiner*—Que T. Le
(74) *Attorney, Agent, or Firm*—Staas & Halsey, LLP

(57) ABSTRACT

A point of sale (POS) device, such as an optical scanner, reduces the beam diameters of two light beam components having been emitted from a common light source and split by an optical beam splitter. The optical scanner includes a light source emitting a light beam, a light beam splitter splitting the emitted light beam, a polygon mirror reflecting the split light beam components into mutually different directions, and groups of mirrors. The groups of mirrors are provided for each reading window, allowing the light beam components to be emitted therefrom. The emitted light beam components can then impinge on an object, whereupon the optical scanner detects by detectors and reads a bar code located on the object. The optical scanner also includes beam shaping devices, one of which is placed between the light source and light splitting device and the other of which is placed in one of the optical paths followed by one of the light beam components. Since the beam diameter of the light beam components are reduced, and since the light beams are emitted from multiple reading windows, bar codes with narrow spaces between the bars can be read more easily, even with varying orientations of the bar code on the object.

28 Claims, 19 Drawing Sheets

Fig.17(A)    Fig.17(B)
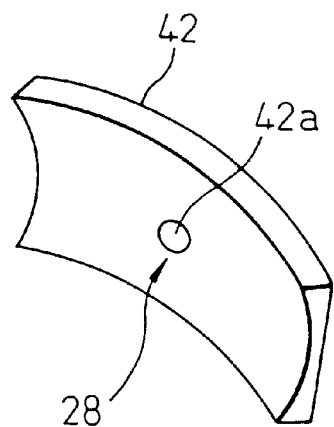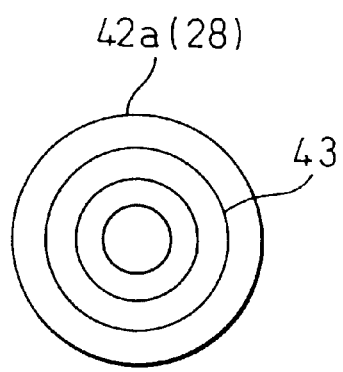
Fig.18
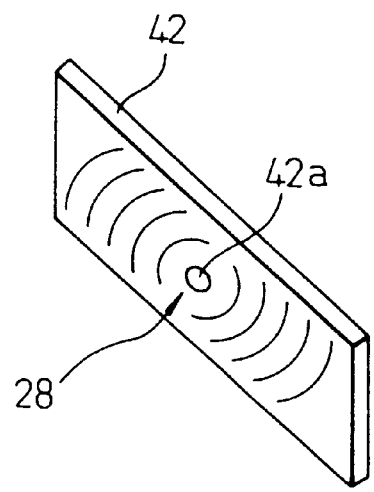

OPTICAL SCANNER AND LIGHT SOURCE MODULE WITH REDUCED LIGHT BEAM DIAMETER

CROSS-REFERENCE TO RELATED APPLICATIONS

This application is based on, and claims priority to Japanese Patent Application 9-208137, filed Aug. 1, 1997 in Japan, and which is incorporated herein by reference.

FIELD OF THE INVENTION

The present invention relates in general to an optical scanner, and in particular, to a method of and device for reducing the beam diameter of separate light beam components emitted from a common light source for optical scanner.

BACKGROUND OF THE INVENTION

Point of Sale (POS) systems, such as optical scanners, capable of detecting and reading light reflected from a bar code attached to a commodity are widely used. For example, optical scanners, which are also referred to as bar code readers, are used at "check-out" counters in grocery stores to scan a bar code attached to a commodity such as a food product. By manipulating the commodity, these optical scanner systems provide an operator, such as a cashier, using the system to reduce the amount of time it takes to "scan" information about the commodity, reducing the burden on the operator and increasing the operator's efficiency.

In recent years, optical scanners with two reading windows have been developed. The two windows are provided, for example, in the bottom and front portions of the optical scanner, forming an "L" shape. The two windows enable the optical scanner to read and scan from multiple directions bar codes attached to commodities. Hence, a bar code attached to a commodity may be detected and read from light sources emitting from both windows, despite differing orientations of the bar code on the commodity. This feature further lightens the burden imposed on the operator. However, conventional optical scanners with multiple windows require separate optical scanners for each window. The result is a costly, complex optical scanner with numerous parts and which is large in size.

For example, optical scanners which have reading windows respectively provided in both the bottom and front portions thereof require optical scanning systems for each of the reading windows. Each of the optical scanning systems includes a light source, scanning means such as a polygon mirror, and other mirrors. Thus, the scanner is complex and requires a large number of components or parts, which increases the manufacturing costs. However, if a common light source is used for both of the optical scanning systems, the required number of parts and the costs associated therewith decrease.

The use of a common light source 1 in an optical scanner 100 is shown in FIG. 27. FIG. 27 is an exemplary prior art diagram illustrating a conventional optical scanner 100 with a common light source 1 and used, for example, to scan a bar code attached to an object. To use a common light source 1 in the optical scanner 100 shown in FIG. 27, a light splitting device 2, such as a half mirror (semi-transparent mirror), is used to split a common light source 1 into a first light beam component X and a second light beam component Y. The first and second light beam components X and Y, respectively, are then directed to a common polygon mirror 3, either directly or through another mirror. Light beam component X is then emitted through a group of mirrors M1 from reading window 4 (provided in the bottom portion of the optical scanner 100), and light beam component Y is emitted through a group of mirrors M2 from reading window 5 (provided in the front portion of the optical scanner 100). The emitted light beam components X and Y then impinge on, for example, a bar code attached to an object passing through the emitted light, which reflects back to the optical scanner 100. The bar code is read by the optical scanner 100 by detecting the reflected light by detectors 6 and 7.

In order to more accurately read a bar code, and in particular, a bar code having narrow spaces between adjacent bars, the beam width of the light beam scanning the bar code must be sufficiently reduced. To reduce the beam width of the light beam scanning the bar code, for example, light beam components X and Y (shown in FIG. 27), a beam shaping device 8 is placed between the common light source 1 and the light splitting device 2. Moreover, it is also necessary not only to reduce the diameter of the light beam components X and Y, but to reduce the diameter at a desired position. That is, the diameter of the beam size must be sufficiently reduced at the desired position, particularly the position where the object is being scanned.

As the width of the bars in the bar code narrows, it becomes increasingly difficult for an emitted light source to read the bar code. A desirable solution to reading bar codes having narrow spaces between bars would be to use a common light source 1 having a smaller diameter. As discussed above, it is desirable to "split" the common light source 1 (i.e., laser beam) into first and second laser beam components X and Y, such that the bar code may be read or scanned from multiple directions (from a bottom portion and a front portion of the optical scanning device). Using the first and second laser beam components X and Y, respectively, an "optimum reading zone" is established by defining first and second focal points of the first and second laser beam components X and Y, respectively. It is desirable that the focal point (a point at which the laser beam has the smallest diameter) of the laser beam is established near the reading center the optimum reading zone. In this regard, the common light source 1 is able to read and scan the bar code with increasing efficiency when the two focal points are directed towards the same location. To accomplish this, it is desirable that the distance from the light source from which the scanning light (light beam component X in FIG. 27) emitted from the bottom reading window 4 to the reading center is equal to the distance from the light source from which the scanning light (light beam component Y in FIG. 27) emitted from the side reading window 5 to the reading center.

However, due to the complexity of the optical components in the optical scanner for prior art, it is difficult to equalize these distances and may result in the focal point of the first light beam component X being set at the center of the optical reading zone, and the focal point of the second light beam component Y being set off-center of the optimal reading zone. In that case, the bar code cannot be read using the second scanning light. Hence, achieving optimal first and second focal points is hindered, resulting in the failure of one of the laser beam components from reading or scanning the bar code as it passes through the "optimum reading zone".

Thus, there exits a need for a cost effective optical scanner having multiple windows which reduces the overall size of the scanner by reducing the number of components required therein. Additionally, there exists a need for an optical scanner having multiple windows capable of reading and scanning a bar code using a common light source.

SUMMARY OF THE INVENTION

An object of the present invention is to provide an optical scanner which reduces the beam diameters of two light beam components into which a light beam emitted from a common light source is split by an optical beam splitter.

Another object of the present invention is to provide an optical scanner which is provided with a common light source and two reading windows, and which can read a bar code with good sensitivity by using light beams respectively emitted from the reading windows.

In accordance with one embodiment of the present invention, an optical scanner includes a body, at least one reading window provided in the body, a light source, light splitting means for splitting a light beam emitted from the light source into a first light beam component traveling along a first optical path, and a second light beam component traveling along a second optical path. Also provided in the optical scanner of the present invention are light scan means allowing the first light beam component and the second light beam component to be emitted from the reading window, first beam shaping means placed between the light source and the light splitting means, and second beam shaping means placed in one of the first and second optical paths.

In accordance with another embodiment of the present invention, an optical scanner includes a body, a first reading window provided in the body, a second reading window provided in the body at an angle with the first reading window, a light source, and light splitting means splitting a light beam emitted from the light source into a first light beam component traveling along a first optical path and a second light beam component traveling along a second optical path. Also provided are scan means allowing the first light beam component and the second light beam component split by the light splitting means to be emitted from the first reading window and the second reading window, at least one detector detecting the light beam which is emitted from the reading windows and impinges on and is reflected by an object, first beam shaping means placed between the light source and the light splitting means, and second beam shaping means placed in one of the first and second optical paths.

In the above-mentioned embodiments of the present invention, a light beam emitted from the light source is shaped by the first beam shaping means in such a manner as to have a reduced beam diameter at a desired position. However, in some cases, each of the two light beam components split by the light splitting means does not have a minimum beam diameter at a desirable position. To solve this problem, the first beam shaping means reduces one of the two light beam components at a desired position, and the second beam shaping means is placed in the optical path of the other light beam component, correcting the position of the light beam to a desired position. Hence, each of the two light beam components split by the light splitting means has a minimum beam diameter at a desired position.

In accordance with another embodiment of the present invention, the scan means comprises a polygon mirror reflecting the first and second light beam components split by the light splitting means, at least one mirror placed between the light splitting means and the polygon mirror, a first group of mirrors causing the first light beam component reflected by the polygon mirror to be emitted from the first reading window, and a second group of mirrors causing the second light beam component reflected by the polygon mirror to be emitted from the second reading window.

In accordance with still another embodiment of the present invention, there is provided an apparatus for scanning an object having a bar code attached thereto. The apparatus comprises a body including first and second reading windows emitting and receiving a light beam, a light splitting device splitting the beam of light emitted from a light source into first and second beam components, a light scan device for directing the first beam component and second beam component through the respective first and second reading windows, a first beam shaping device, a second beam shaping device, and a first and second detector for detecting the first and second beam components, respectively.

In accordance with yet another embodiment of the present invention, there is provided a light source module. The light source module comprises a light source, first and second beam shaping means, a light splitter splitting a light beam which is emitted from the light source. The first beam shaping means shapes a cross-sectional shape of the light beam and the second beam shaping means changes a focal distance of the light beam.

In accordance with another embodiment of the present invention, there is provided a light source module. The light source module comprises a light source, a beam shaping device, a light splitter splitting a light beam which is emitted from the light source into first and second light beams. The beam shaping device changes a focal position of one of the first and second light beams to a position in from of or beyond a focal position of the other one of the first and second light beams.

In one aspect of the present invention, the first beam shaping means reduces the light beam diameter at a first distance from the light source, and the second beam shaping means reduces the beam diameter of the light beam traveling along an optical path at a second distance from the light source which is different from the first distance.

In another aspect of the present invention, the first beam shaping means includes a collimator lens and an aperture.

In still another aspect of the present invention, the second beam shaping means comprises a convex lens whose focal length is greater than the collimator lens. Alternatively, the second beam shaping means comprises a concave lens, or a concave mirror.

In a further aspect of the present invention, the light source, the light splitting means and the first beam shaping means are formed as one unit.

In yet another aspect of the present invention, the light source, the light splitting means, the first beam shaping means and the second beam shaping means are formed as one unit.

In accordance with another embodiment of the present invention, a method for scanning an object using an optical scanner splits a light beam emitted from a light source, emits first and second beams respectively through first and second reading windows, scans the first and second beam components through the first and second reading windows such that the emitted light cross paths at an optical reading position, shapes the light beam and first or second beam components to minimize the diameter of the both the first and second beam components at the optical reading position, and detects the object.

These together with other objects and advantages which will be subsequently apparent, reside in the details of construction and operation as more fully hereinafter described and claimed, reference being had to the accompanying drawings forming a part hereof, wherein like numerals refer to like parts throughout.

BRIEF DESCRIPTION OF THE DRAWINGS

FIGS. 17(A) and (B) are exemplary diagrams showing a reflecting mirror which includes the second beam shaping device of FIG. 16;

FIG. 18 is an exemplary diagram showing another example of a modification of the reflecting mirror of FIG. 17;

DETAILED DESCRIPTION OF THE PREFERRED EMBODIMENTS

Figure 1:
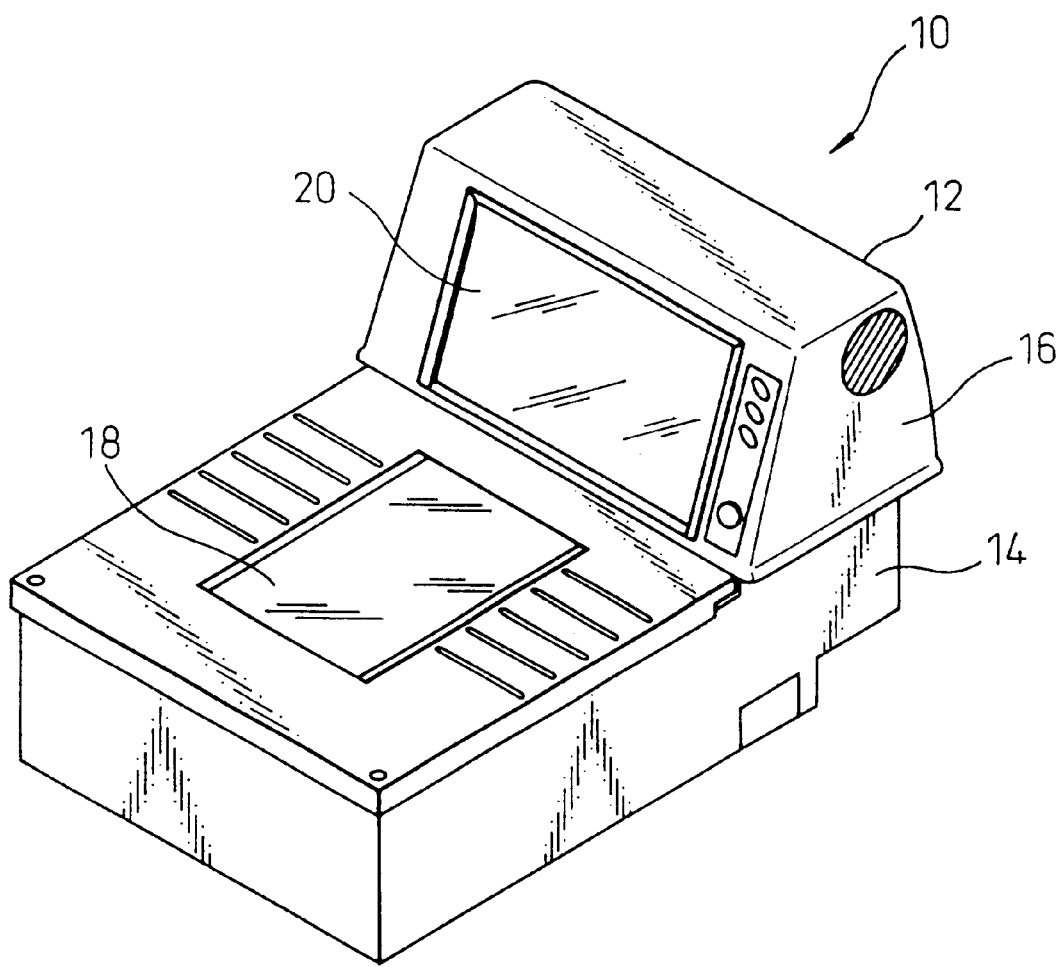
FIG. 1 is a perspective diagram showing an optical scanner embodying the present invention.
Figure 2:
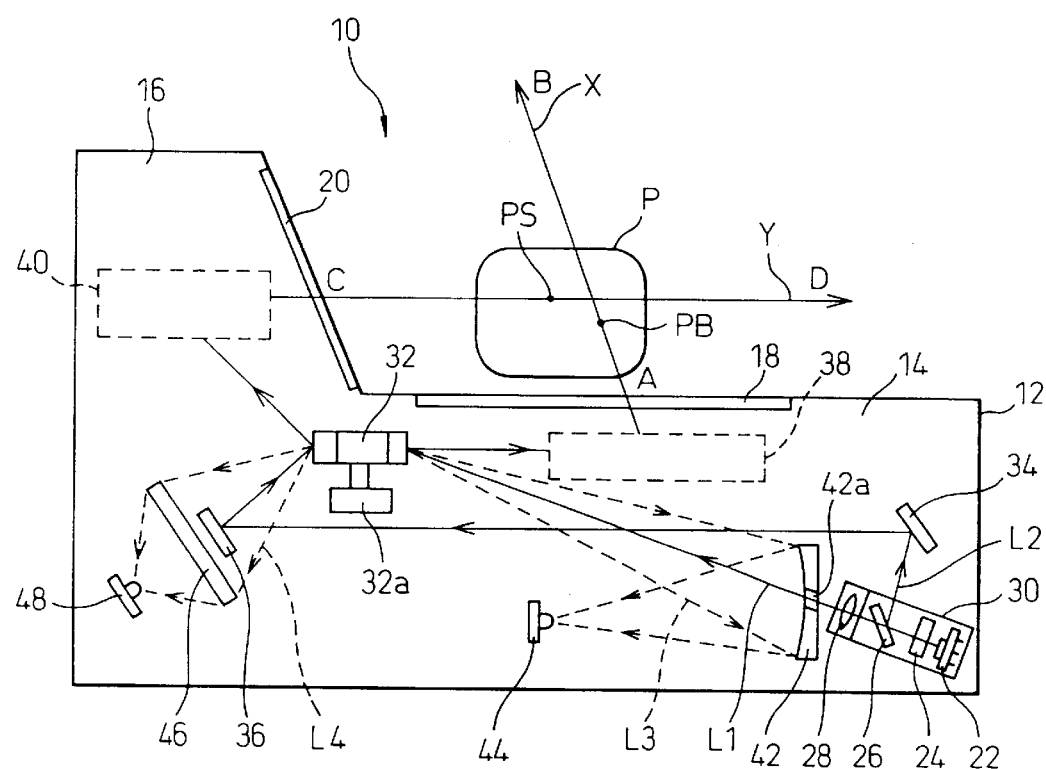
FIG. 2 is a cross-sectional diagram schematically illustrating the internal structure of the optical scanner embodying the present invention.

FIGS. 1 and 2 are exemplary diagrams illustrating an optical scanner, such as a bar code reader, according to one embodiment of the present invention. The optical scanner 10 includes a body 12, a base portion 14 and a cover portion 16.

A bottom reading window 18 is provided in the surface of the base portion 14, and a side reading window 20 is provided in the surface of the cover portion 16. The bottom reading window 18 and the side reading window 20 are placed at an angle with respect to each other, forming essentially an "L" shape.

As shown in FIG. 2, a light beam emitted from the bottom reading window 18 is designated by an arrow X, and another light beam emitted from the side reading window 20 is designated by an arrow Y. An optimum reading zone (region P) extends over the bottom reading window 18 and has a center at a predetermined distance from the side reading window 20. Hence, when an object is in the optimum reading zone (region P), a commodity with a bar code attached can be read optimally. In addition, even if the commodity, or object, is outside of the optimum reading zone P, a bar code attached thereto can be read, but may not be read successfully.

Referring to FIG. 2, the optical scanner 10 includes a light source (such as a laser diode) 22, a first beam shaping device 24, a light splitting member 26, and a second beam shaping device 28. These members are attached to a common frame and comprise a single unit designated as light source module 30.

The optical scanner 10 further includes a polygon mirror 32, which is rotated by a motor 32a, and two mirrors 34 and 36. The light source module 30 is located near a lower end of the base portion 14 towards the rightmost end portion of the main body 12 as viewed in FIG. 2. The mirror 34 is located above the light source module 30 which is at one end of the base portion 14, and the mirror 36 is located near the other end of the base portion 14. The polygon mirror 32 is located in the vicinity of the leftmost portion of the main body 12, between the reading windows 18 and 20.

Examples of light splitting member 26 include a half mirror, a half-cube beam splitter, or a polarization beam splitter. Light splitting member 26 splits a light beam emitted from the light source 22 into a first light beam component traveling along a first optical path L1, and a second light beam component traveling along a second optical path L2. In the example of FIG. 2, the first light beam component L1 is transmitted through the light splitting member 26, and travels in a straight line to one side of the polygon mirror 32. The second light beam component L2 is reflected by the light splitting member 26 and transmitted first to mirror 34 and then reflected to mirror 36 so that the optical path from light splitting member 26 to the other side of polygon mirror 32 is bent. Mirror 36 reflects the second light beam component L2 to the other side of polygon mirror 32. The second light beam component L2, when reflected between mirrors 34 and 36, travels along a path located under the polygon mirror 32.

The first light beam component L1 reflected by the polygon mirror 32 is emitted from the bottom reading window 18 through a group of bottom mirrors 38 as, for example, a light beam X which scans an object. The second light beam component L2 is emitted from the side reading window 20 through a group of mirrors 40 as, for example, a light beam Y which then scans the object. In order for an object to be scanned by the light beams X and Y, the object must pass through a space zone referred to as an optimum reading zone. This optimum reading zone, which extends over the bottom reading window 18, and has a center at a predetermined distance from the side reading window 20, is defined in FIG. 2 as region P. An object to be scanned, including, for example, a bar code, passing through region P can then be optimally read. If the object passes outside the optimum region P, bar code can still be read, however, the accuracy is substantially reduced.

More specifically, when an object is present in (or around) the optimum reading zone P, the light beams X and Y are scanned and reflected off of the object in scattered directions. The reflected, scattered light re-enters the bottom reading window 18 and the side reading window 20. The reflected, scattered light re-entering the reading window 18 is then reflected by one side of polygon mirror 32, as illustrated by L3. Similarly, the reflected, scattered light re-entering the side window 20 is then reflected by the other side of polygon mirror 32, as illustrated by L4.

To detect the reflected light, a reflecting mirror 42 is placed near the light source module 30 in the optical path of the first light beam component L1. The reflecting mirror 42 is formed as a concave mirror, having a hole 42a bored in the central portion. The hole 42a permits the first light beam component L1, which is transmitted to the polygon mirror 32 from the light splitting member 26, to pass therethrough. A first detector 44 is placed at the focal point of the reflecting mirror 42. The reflected light beam L3 upon re-entering the reading window 18, impinges upon reflecting mirror 42, and is condensed and incident to the first detector 44. The first detector 44, for example a pin photodiode, operates to convert the quantity of detected light into an electric signal. This electric signal is sent to an electric circuit (not shown), in which demodulation or the like is performed thereon. Thus, for example, a bar code attached to an object is read.

A collector 46, larger in size than the mirror 36, is placed on the rear side of the mirror 36. The collector 46 comprises, for example, a convex lens or Fresnel lens. A second detector 48 is placed at the focal point of the collector 46 to detect the reflected light beam L4 which passes through and is condensed by the collector 46. The second detector 48 comprises, for example, a pin photodiode, and operates to convert the quantity of detected light into an electric signal. The electric signal is sent to an electric circuit (not shown), whereupon an object having, for example, a bar code attached thereto can be read.

Figure 3:
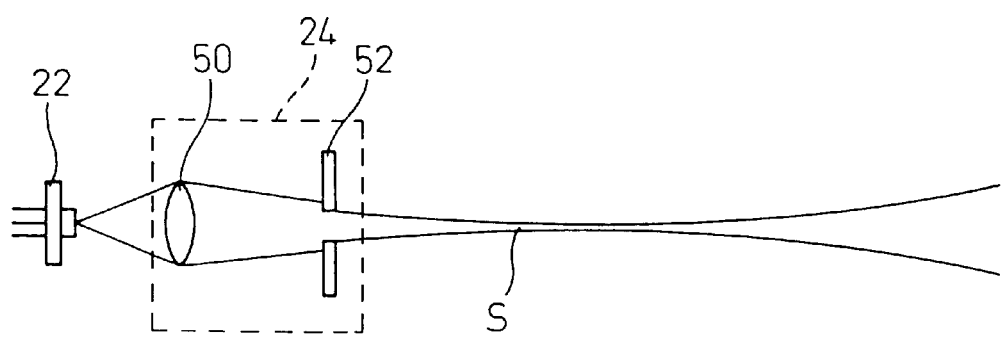
FIG. 3 is an enlarged diagram showing the first beam shaping device of FIG. 2.

FIG. 3 illustrates an example of the first beam shaping device 24. The first beam shaping device 24 comprises a collimator lens 50 and an aperture 52, which are formed as a single unit serving as a module. The collimator lens 50 condenses divergent light beams emitted from the light source (for example, a laser light source) 22 so that the light beams are made to be slightly convergent in comparison with parallel beams. The aperture 52 operates to cut off any extra part of the light beam passing through the collimator lens 50, further reducing the beam diameter. In this regard, the diameter of the light beam emitted from the aperture 52 gradually decreases, until passing through a section S in which the light beam has a minimum beam diameter. After passing through section S, the beam diameter gradually begins to increase.

Figure 4:
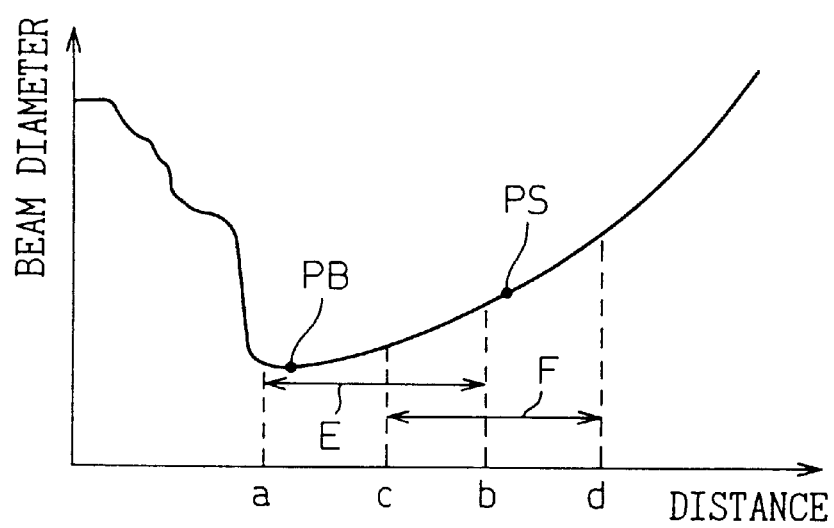
FIG. 4 is an exemplary graph illustrating the relationship between the beam diameter of a light beam passing through the first beam shaping device and the distance from a light source.

FIG. 4 is an exemplary graph illustrating the relationship between the beam diameter of a light beam, having passed through the beam shaping device 24, and the distance from the light source 22. The distances a, b, c and d correspond to the positions A, B, C and D found in FIG. 2. Namely, the distance a corresponds to the distance between the light source 22 and position A on the bottom reading window 18, the distance b corresponds to the distance from the light source 22 to position B on the optimum reading zone (region P) through the bottom reading window 18, the distance c corresponds to the position C on the side reading window 20, and the distance d corresponds to the distance between the light source 22 and the position D located across from the optimum reading zone (region P) through the side reading window 20.

Referring to FIG. 4, a bottom reading zone E is a region in which an object having a bar code attached thereto can be read by a light beam emitted from the bottom reading window 18. A side reading zone F is a region in which an object having a bar code attached thereto can be read by using a light beam emitted from the side reading window 20. The optimum reading zone (region P) is narrower than either the bottom reading zone E or the side reading zone F. The point PB corresponds to the distance between the light source 22 and the center of the optimum reading zone (region P) of FIG. 2 in the direction along line AB. Additionally, the point PS corresponds to the distance between the light source 22 and the center of the optimum reading zone (region P) of FIG. 2 in the direction along line CD.

As indicated from FIGS. 2 and 4, the distance between the light source 22 and the point PB is shorter than the distance between the light source 22 and the point PS. In such a case, the conventional scanner is set such that the point PS is the point at which light beam X has a minimum beam diameter. Hence, as described above, the position at which the light beam Y has a minimum beam diameter is not the point PS. As a result, the beam diameter at the point PS is slightly larger than the minimum beam diameter. When the pitch of the bars of a bar code is further reduced, it is preferable that scanning is performed using a light beam with a diameter further reduced. Hence, the second beam shaping device 28, provided in the present invention, reduces the beam diameter of the light beam Y in the vicinity of the point PS.

Figure 5:
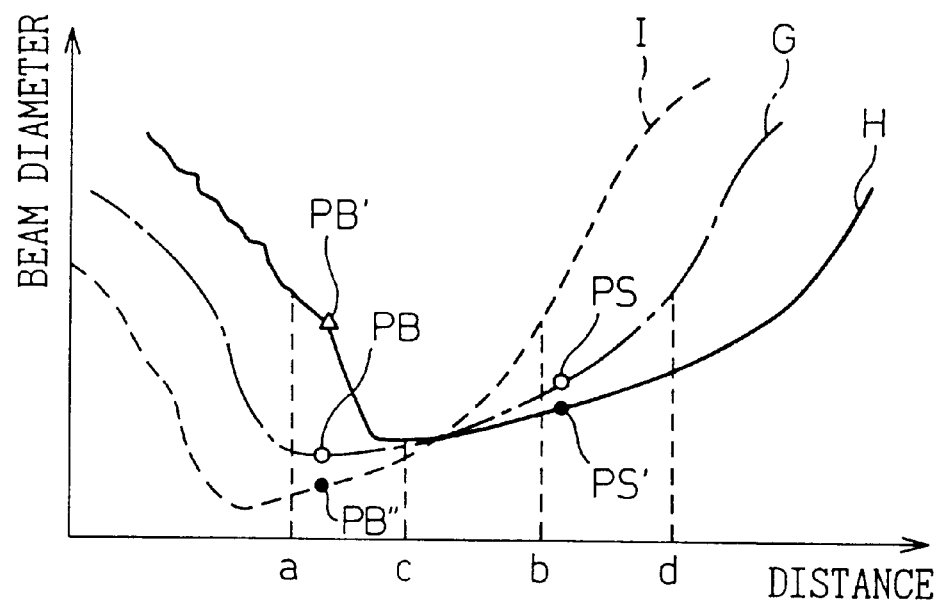
FIG. 5 is an exemplary graph illustrating beam shaping performed by the first and second beam shaping device of FIG. 2.

FIG. 5 is an exemplary graph illustrating the characteristics of the first beam shaping device 24 and the second beam shaping device 28 of the present invention. Curve G represents the graph illustrated in FIG. 4. Curve H represents the beam diameter when the setting of the first beam shaping device 24 is changed to decrease the beam diameter at the point PS, as described below. Thus, the beam diameter corresponding to the point PS on curve G is transferred to the beam diameter corresponding to the point PS' on curve H. In particular, the beam diameter of the light beam Y, emitted from the side reading window 20, is reduced at the point PS. As a result, the beam diameter represented by curve H between points c and d is further reduced over that of curve G. Similarly, the curve I represents the beam diameter when the setting of the second beam shaping device 28 is changed to decrease the beam diameter of the light beam X at the point PB. The beam diameter represented by curve I between points a and b is further reduced over that of curves G and H. Therefore, the beam diameter is decreased over the entire reading zone, allowing bar codes having a small width to be read using any of the light beams.

To change the characteristics shown in curve G to those shown in curve H, and hence improve the performance of the optical scanner, the setting of the first beam shaping device 24 is changed to increase the distance between the light source 22 and the position of the focal point S at which the light beam has the minimum beam diameter. This is accomplished by increasing the focal length of the collimator lens 50 of the first beam shaping device 24 to a length greater than the length shown in FIG. 4. For example, curve G represents the case when the focal length of the collimator 50 is 3.6 mm, and the curve H represents the case when the focal length of the collimator 50 is 14 mm. The change in characteristics of the curve G to that represented by the curve H is attained by changing the diameter of the aperture 52, or by changing the distance between the light source 22 and the collimator lens 50.

However, a problem arises in that the point PB on curve G moves to the point PB' on curve H indicating that the beam diameter of the light beam emitted from the bottom reading window 18 is increased. To solve this problem, the second beam shaping device 28 is placed in the optical path of the first light beam component L1 as shown in FIG. 2, and the point PB on curve G moves to the point PB' on curve H, as represented on the graph illustrated in FIG. 5. As a result, the diameter of light beam X emitted from bottom reading window 18 is decreased. Hence, beam shaping is performed by second beam shaping device 28 only on the light beam X, and the beam diameter of the light beam emitted from the bottom reading window 18 is decreased. That is, when light beam X is emitted from reading window 18, the characteristics corresponding to the position of the focus is changed from that represented by curve H to that represented by curve I. Moreover, the beam diameter at the point PB' on the curve H is reduced to that at the point PB" on the curve I.

When the second beam shaping device 28 is placed after the beam splitter 26, the focal length f of the plano-convex lens of the second beam shaping device 28 is 3000 mm. Since the focal length of the collimator lens 50 is 14 mm, the plano-convex lens of the second beam shaping device 28 for reducing the beam diameter of the light beam X at the point PS has a focal length which is hundreds of times as long as the focal length of the collimator lens 50.

As a result, the beam diameters of the light beams X and Y emitted from the bottom reading window 18 and the side reading window 20, respectively, are decreased. Scanning of an object can, therefore, be performed using the light beam with the smaller beam diameter. In the module of the embodiment of the present invention, the focal point of the light beam component Y is adjusted to the optimum reading position. The focal point of the light beam component X, which is collimated by the collimator lens 50, is set at a position whose distance from the light source is slightly shorter, by using the plano-convex lens.

Figure 6:
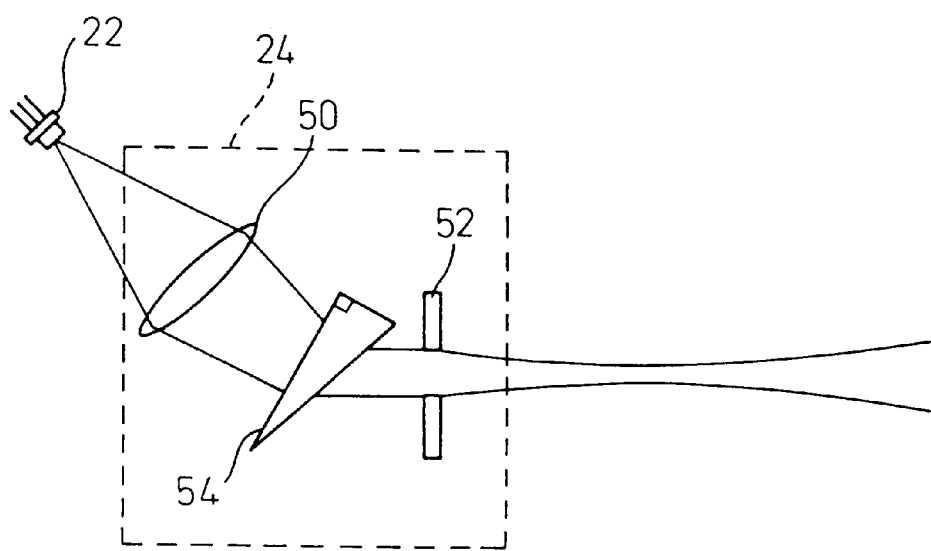
FIG. 6 is an exemplary diagram showing a modification of the first beam shaping device.

FIG. 6 is an exemplary diagram illustrating modification of the first beam shaping device 24. In this example, the first beam shaping device 24 further includes a right-angle prism 54 between the collimator lens 50 and the aperture 52. The right-angle prism 54 is placed so that the oblique side of the right-angle prism 54 faces the aperture 52. However, the right-angle prism 54 may be placed so that the oblique side of the right-angle prism 54 faces the light source 22. Moreover, instead of the right-angle prism 54, other prisms may be employed.

Figure 7:
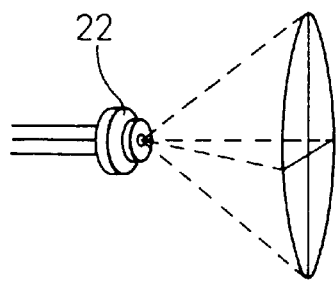
FIG. 7 is an exemplary diagram illustrating the divergence angle in the vertical direction of a light beam emitted from the light source different from the divergence angle in the transverse direction.

As illustrated in FIG. 7, when a light beam is emitted from the laser diode 22, the divergence angle of one of the first and second light beam components, which are orthogonal to each other, is generally larger than the divergence angle of the other light beam component. The light beam is shaped by the right-angle prism 54 which reduces the larger divergence angle of the one of the light beam diameters to a value equal to the divergence angle of the other light beam diameter. For example, the right-angle prism 54 reduces the beam diameter of the longitudinal light beam having a large divergence angle, but does not reduce the beam diameter of the transverse light beam having a small divergence angle.

Figure 8:
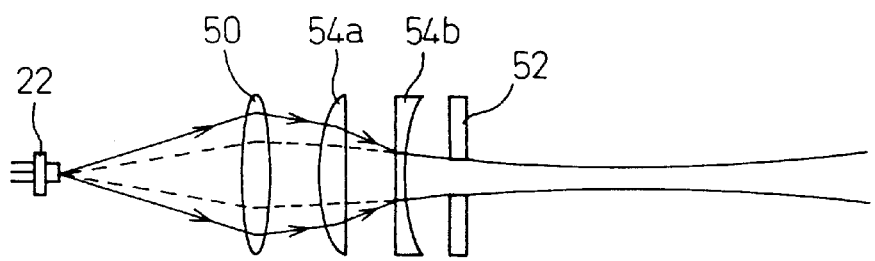
FIG. 8 is an exemplary diagram showing a modification of the first beam shaping device in another embodiment of the present invention.

FIG. 8 is an exemplary diagram illustrating a cylindrical convex lens 54a and a cylindrical concave lens 54b, in place of the right-angle prism 54. In this example, the divergence angle of the longitudinal light beam, which is indicated by solid lines and initially has a large divergence angle, can be made to be equal to the divergence angle of the transverse light beam which initially has a small divergence angle and is indicated by the dashed lines.

A light source module 30 which includes the right-angle prism is shown and described with reference to FIGS. 26(A)–26(D) herein below.

Figure 9:
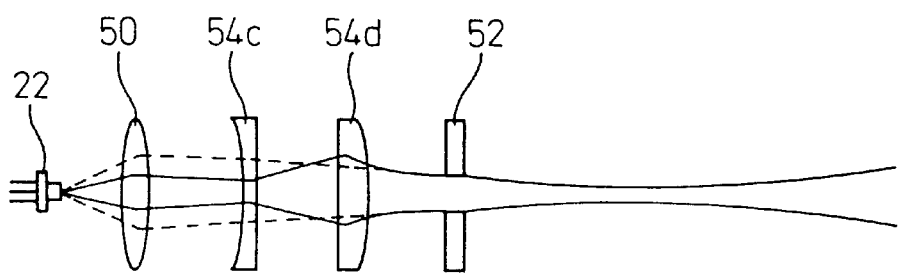
FIG. 9 is an exemplary diagram showing a modification of the first beam shaping device in another embodiment of the present invention.

FIG. 9 is an exemplary diagram showing a modification of the first beam shaping device 24 in another embodiment of the present invention. Referring to FIG. 9, an example is provided with a cylindrical concave lens 54c and a cylindrical convex lens 54d, similar to the above example. In this case, the divergence angle of the transverse light beam, which is indicated by the solid line and initially has a small divergence angle, is made to be equal with the divergence angle of the longitudinal light beam which initially has a large divergence angle and is indicated by dashed lines.

Figure 10:
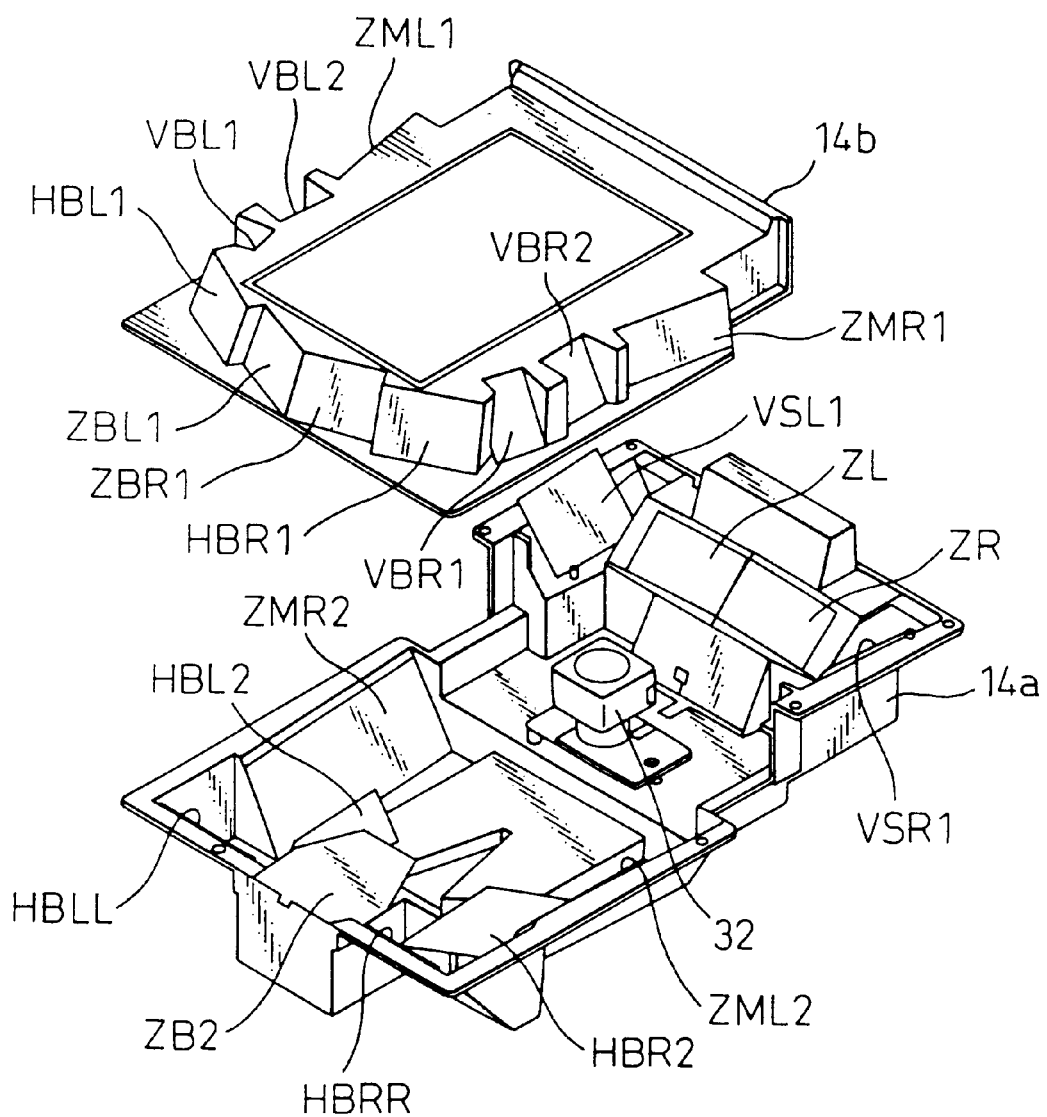
FIG. 10 is an exploded diagram showing the lower and upper frames of the body of the optical scanner, illustrating mirrors of a bottom mirror group.
Figure 11:
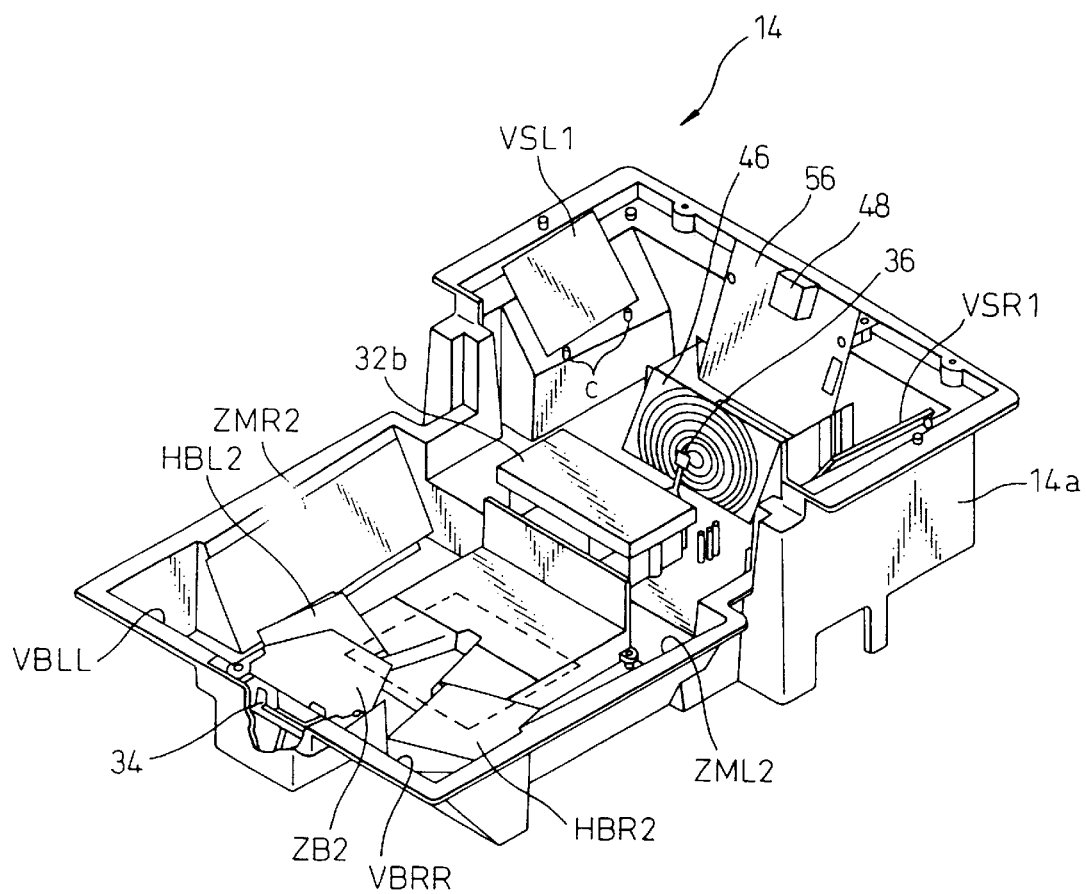
FIG. 11 is an enlarged diagram showing the lower frame of FIG. 7.

FIGS. 10 and 11 are exemplary diagrams illustrating the placement of a group of the bottom mirrors 38 of FIG. 2. In FIGS. 10 and 11, the mirrors are illustrated so that the mirrors of FIG. 2 are reversed from left to right. Although the group of the bottom mirrors 38 depicted in FIG. 2 are placed just under the bottom reading window 18 of the base portion 14, the group of bottom mirrors 38 may be placed in other locations, such as in a lower part or a peripheral part of the base portion 14.

More specifically, FIG. 10 illustrates that the base portion 14 of FIG. 2 comprises of a lower frame 14a and an upper frame 14b. FIG. 11 shows only the lower frame 14a of the base portion 14, but the upper frame 14b is mounted to the left-side part of the lower frame 14a. The cover portion 16 of FIG. 2 is mounted to the right-side part of FIG. 11.

The polygon mirror 32 is shown in the central part of the lower frame 14 of FIG. 10. A support base 32b is shown in the central part of the lower frame 14a of FIG. 11. The polygon mirror 32 (not shown in FIG. 11) is mounted to this support base 32b. Additionally, the mirror 34 which receives a light beam reflected by the light splitting member 26 of FIG. 2 is illustrated in the left end part of FIG. 11. The light source module 30 of FIG. 2 is placed below this mirror 34. The mirror 36 receiving a light beam reflected by the mirror 34 is shown in a right end part of FIG. 11. The collector 46 of FIG. 2 is shown in the rear of this mirror 36 as a Fresnel lens. The second detector 48 receiving reflected light condensed by the collector 46 is mounted on a printed circuit board 56. The first detector 44 is also mounted on the printed circuit board (not shown) which is placed in a "V-zone" of the left-end bottom portion of FIG. 11.

As shown in FIGS. 10 and 11, the lower frame 14a is also provided with mirrors ZB2, VBRR, VBLL, HBR2, HBL2, ZML2 and ZMR2. These mirrors comprise a part of the group of bottom mirrors 38. The lower frame 14a is also provided with the mirrors VSR1 and VSL1. FIG. 10 depicts mirrors ZL and ZR attached to a cover (not shown). These mirrors comprise a part of the group of side mirrors 40. These mirrors are placed such that the reflecting faces thereof are directed nearly obliquely upwardly.

The upper frame 14b is provided with mirrors ZBR1, ZBL1, HBR1, HBL1, VBR1, VBL1, VBR2, VBL2, ZMR1 and ZML1. These mirrors comprise a part of the group of bottom mirrors 38. These mirrors are placed such that the reflecting faces thereof are directed nearly obliquely downwardly.

A light beam emitted from the light source 22, transmitted by the light splitting member 26, is reflected by the polygon mirror 32, and is incident to the mirrors of the upper frame 14. When, however, the polygon mirror 32 is rotated clockwise, scanning is performed on the mirrors ZMR1, VBR2, VBR1, HBR1, ZBR1, ZBL1, HBL1, VBL1, VBL2 and ZML1, in this order. The light beam reflected by the mirrors of the upper frame 14b go to the mirrors of the lower frame 14a. For example, the light beam reflected by the mirror ZMR1 is further reflected upwardly by the mirror ZMR2, and is then emitted from the bottom reading window 18. The light beam reflected by the mirrors VBR2 and VBR1 is further reflected by the mirror VBRR upwardly, and is then emitted from the bottom reading window 18, and so on.

Figure 12:
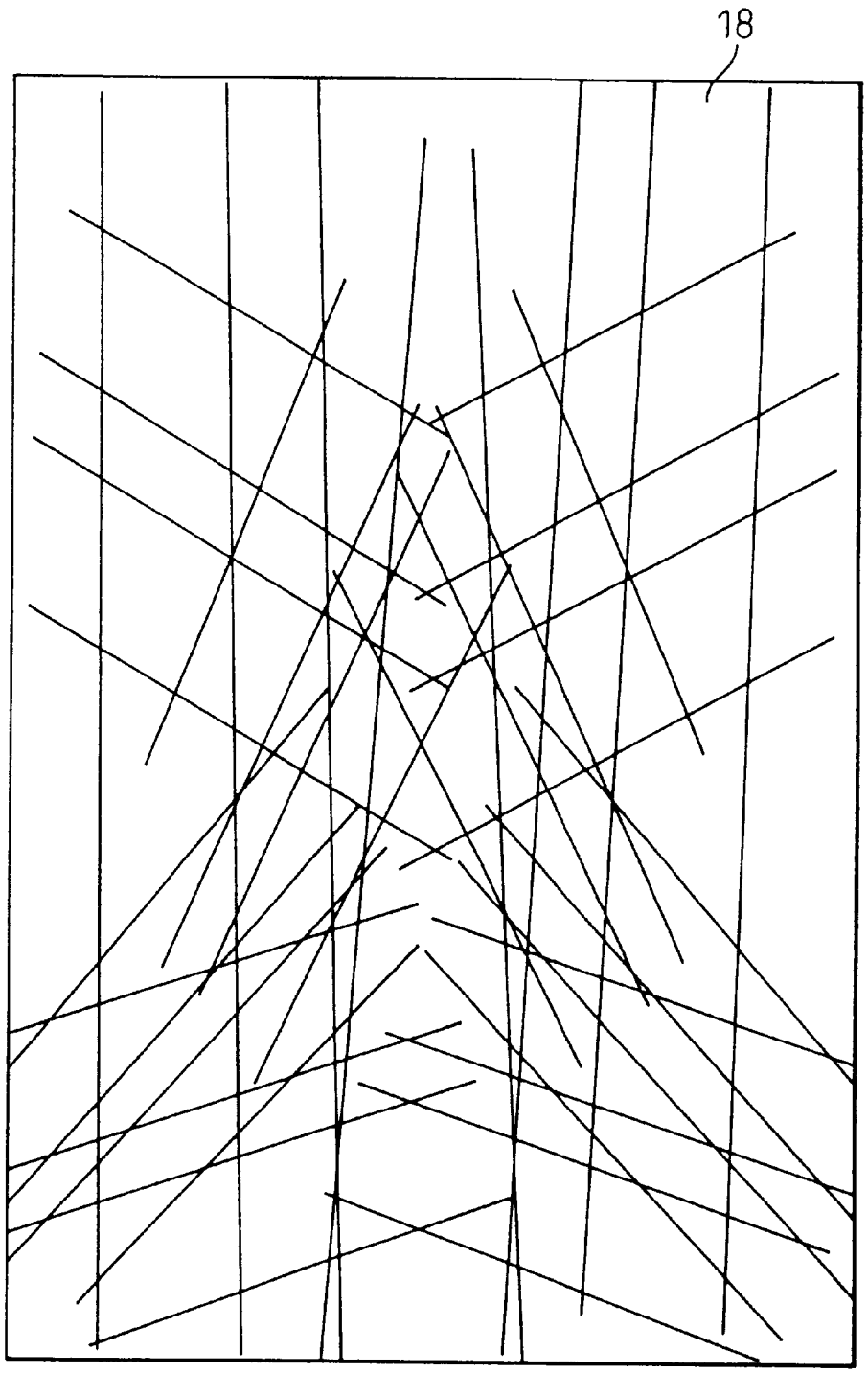
FIG. 12 is an exemplary diagram showing light beams emitted from the bottom reading window.
Figure 13:
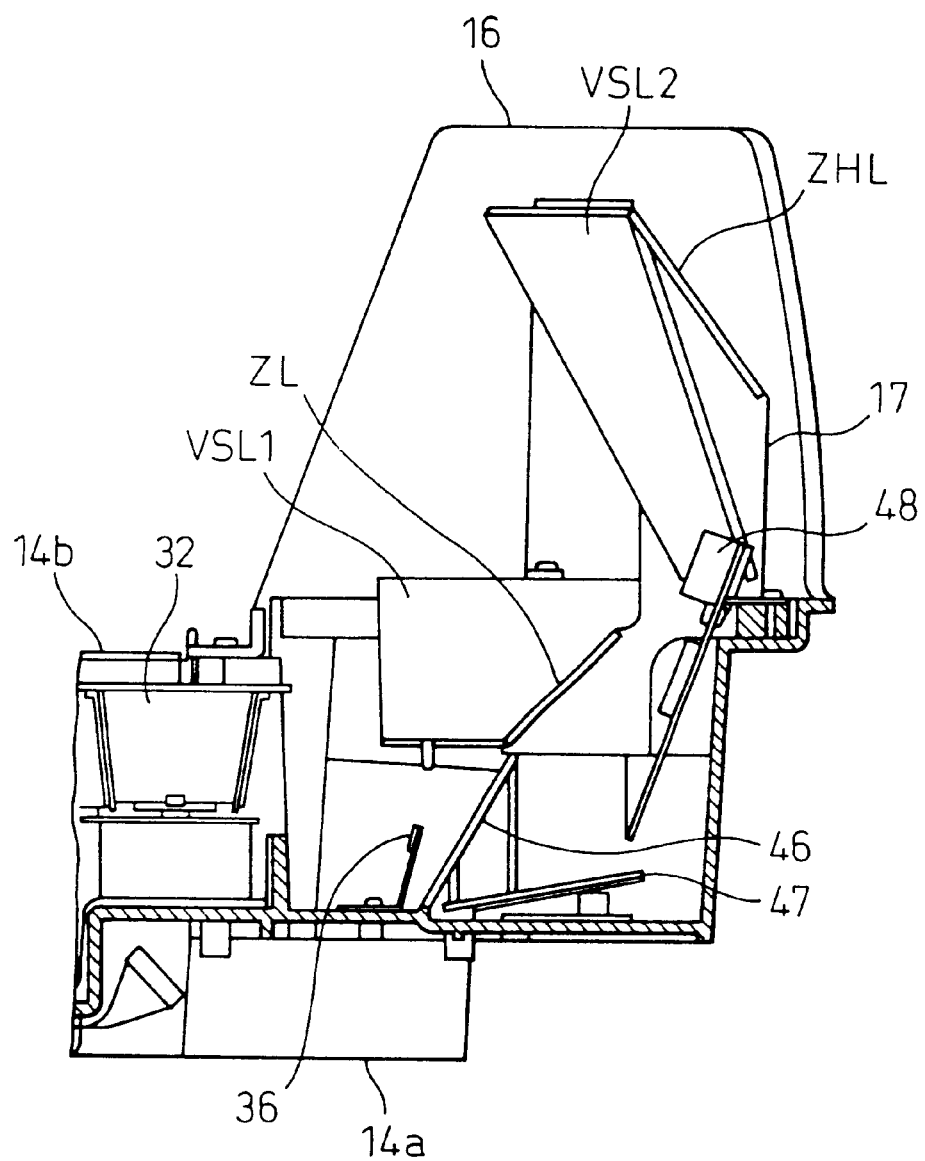
FIG. 13 is a partially cross-sectional diagram showing the lower and upper frames of the body of the optical scanner, illustrating mirrors of a side mirror group.
Figure 14:
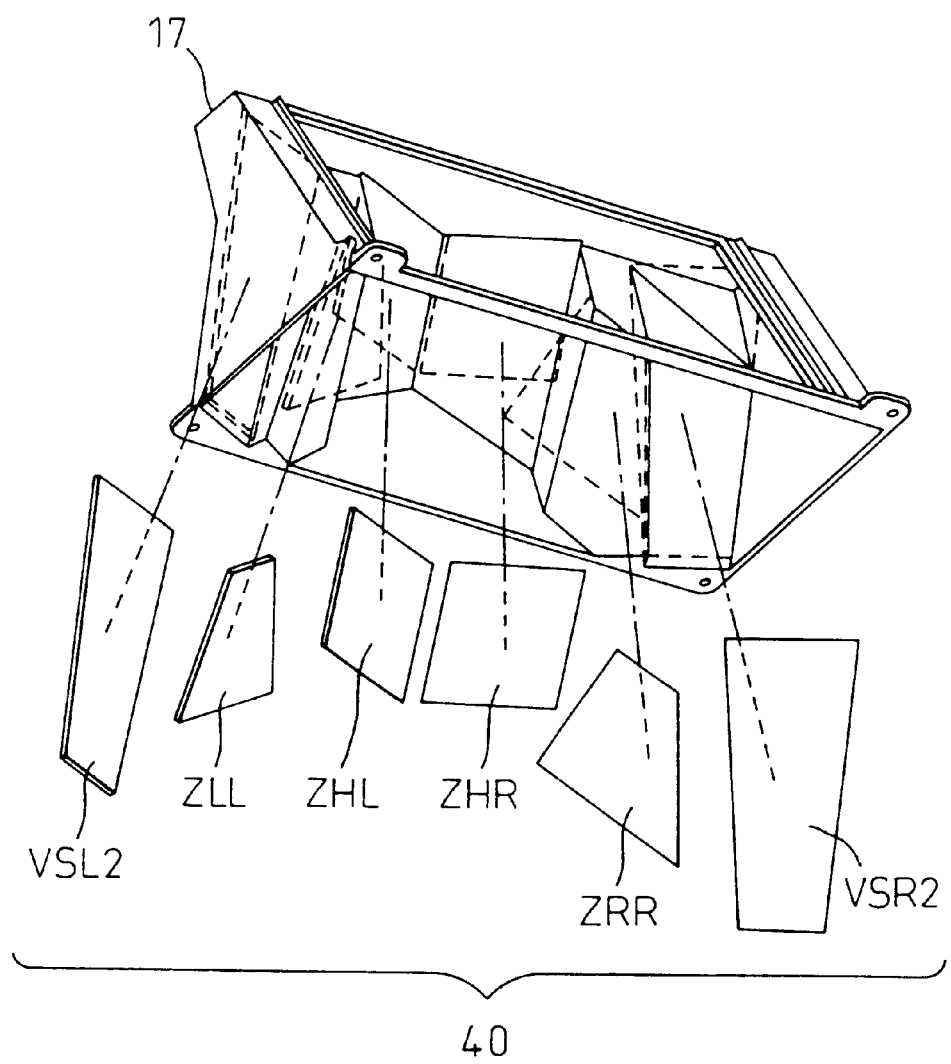
FIG. 14 is a perspective diagram showing mirrors mounted in a mirror frame placed in a cover.

As a result, as illustrated in FIG. 12, light beams are emitted from the bottom reading window 18 in various directions and angles. Thus, an object can be scanned in various directions, angles, and orientations. An arrow X in FIG. 2 indicates a light beam emitted from the bottom reading window 18 of the optical scanner 10 of the present invention, which, after impinging upon an object, is detected by first detector 44. Additionally, as shown in FIGS. 13 and 14, the cover portion includes a mirror holder 17, in which the mirrors VSL2, ZLL, ZHL, ZHR, ZRR, and VSR2 are mounted. These mirrors comprise a group of side mirrors 40.

Regarding the group 40 of side mirrors, a light beam which is emitted from the light source 22 and is reflected by the light splitting member 26, travels toward the polygon mirror 32. Then, the light beam reflected by the polygon mirror 32 is incident on the mirrors VSR1, VSL1, ZL and ZR of the lower frame 14a. Scanning is performed on the mirrors VSL1, ZL, ZR and VSR1, in this order. The light beam reflected by these mirrors then travels to the mirrors of the mirror holder 17. Subsequently, the light beam reflected by the mirrors of the mirror holder 17 is emitted from the side reading window 20. As shown in FIG. 13, a mirror 47 is also placed between the collector 46 and the second detector 48. Thus, a light beam having passed through the collector 46 is reflected to the mirror 47, and is then incident on the second detector 48.

Figure 15:
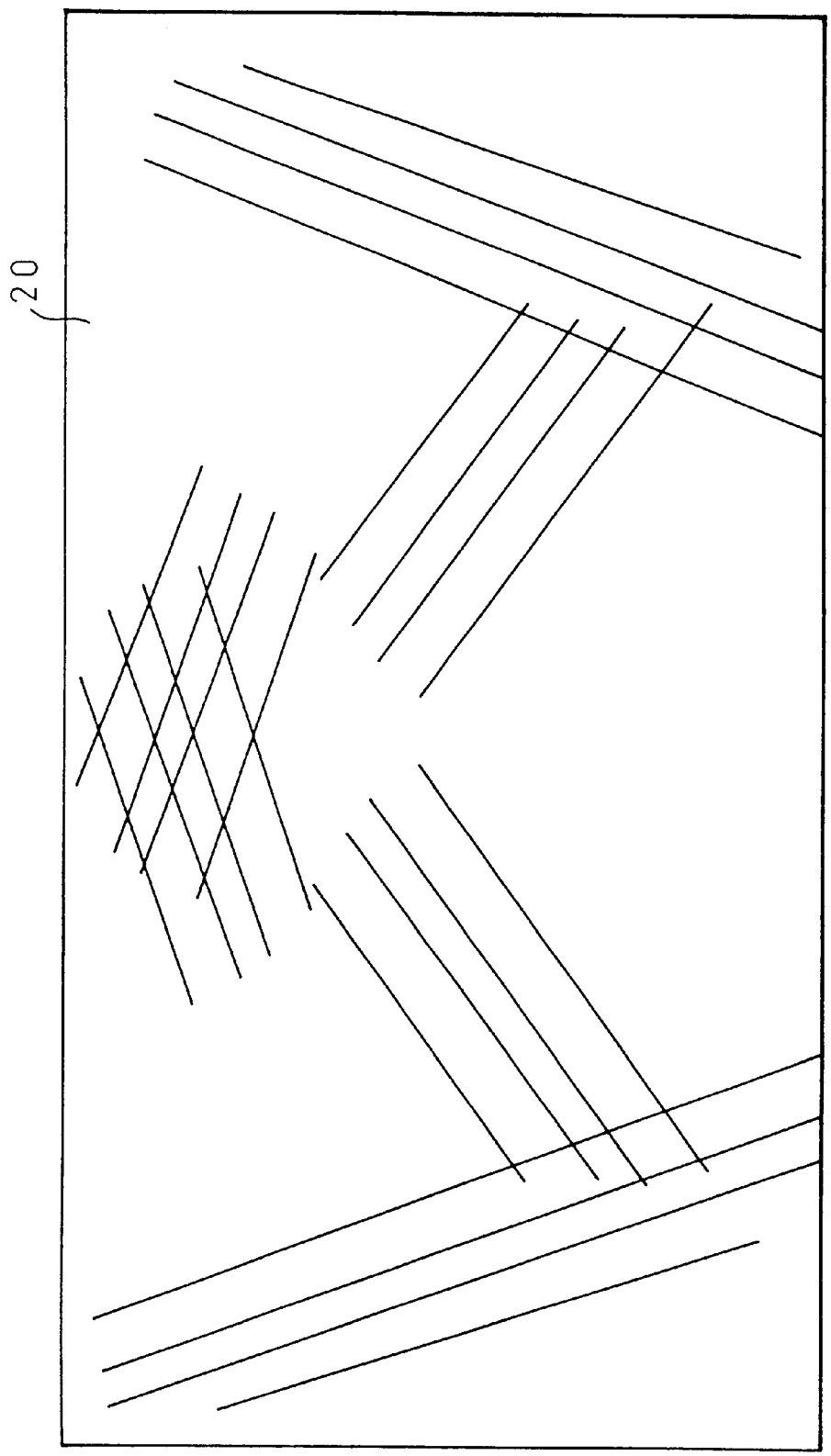
FIG. 15 is an exemplary diagram showing light beams emitted from the side reading window.

As illustrated in FIG. 15, light beams, emitted from the side reading window 20 in various directions and at diverse angles, scan an object. An arrow Y shown in FIG. 2 indicates a typical one of these light beam. After having impinged on an object, the reflected light beam is detected by second detector 48. Therefore, unless a bar code is attached to an object directly upward, most bar codes can be read by using the light beams emitted from the bottom reading window 18 and the side reading window 20.

Figure 16:
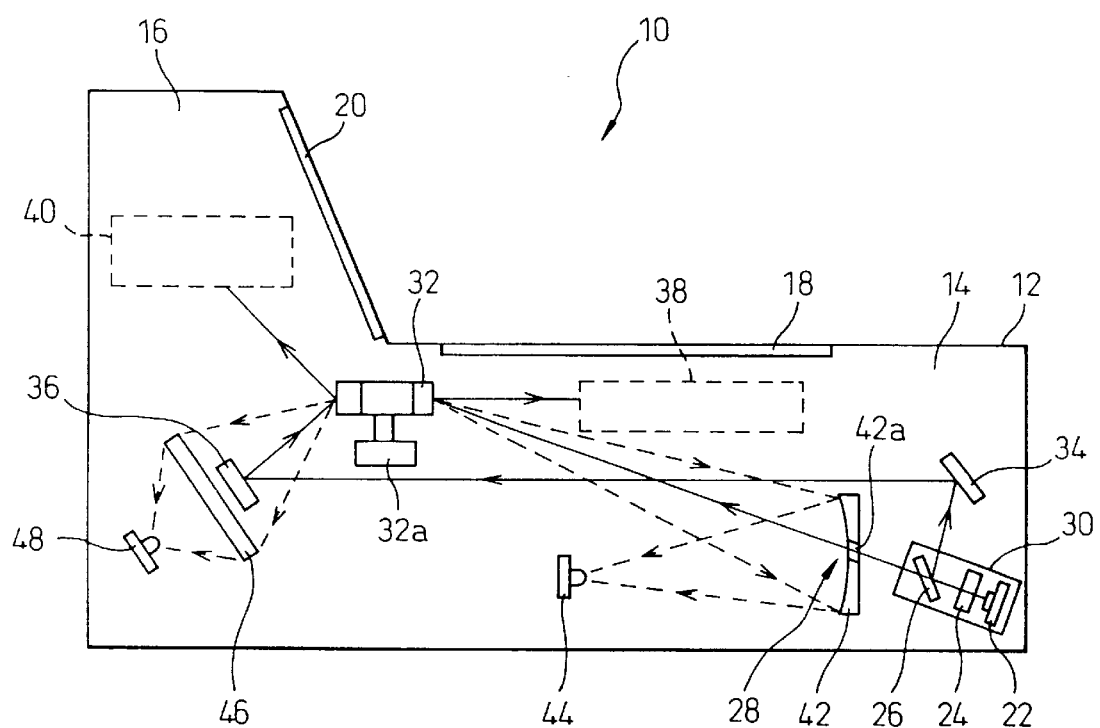
FIG. 16 is a cross-sectional diagram schematically illustrating the internal structure of the optical scanner or another embodiment of the present invention.

FIG. 16 is an exemplary diagram illustrating another embodiment of the present invention. The embodiment shown in FIG. 16 is similar to the embodiment of the present invention described herein above. However, in the embodiment of FIG. 16, the second beam shaping device 28 is located in a different place than the second beam shaping device 28 in the above-described first embodiment. In the embodiment of FIG. 16, the second beam shaping device 28 is formed as a plano-convex lens inserted in a hole 42a bored in the reflecting mirror 42. The hole 42a bored in the reflecting mirror 42 permits a first light beam component, which travels from the light splitting member 26 to the polygon mirror 32, to pass therethrough. Additionally, the second beam shaping device 28 provided therein performs "beam-shaping". The second beam shaping device 28 formed in the hole 42a of the reflecting mirror 42 can be formed by a plano-convex lens which is similar to that of FIG. 2. Therefore, the operation and advantageous effects of this second embodiment shown in FIG. 16 are similar to those of the above-described first embodiment shown in FIG. 2.

FIG. 17(A) is a perspective diagram showing the reflecting mirror 42, which is formed as a concave mirror as described with respect to FIG. 2. FIG. 17(B) is an exemplary plan diagram illustrating a modification of the reflecting mirror 42. In a hole 42a bored in the reflecting mirror 42, a transmission type of hologram 43 having a concentric circular pattern is provided. A transmission type of hologram 43 condenses transmitted light. Thus, the hologram serves as the second beam shaping device 28, similar to the plano-convex lens in the first embodiment. The plano-convex lens and/or a hologram may be formed in such a manner as to be integral with the concave mirror 42 (not shown in FIG. 17(B)). Further, the plano-convex lens and/or a hologram may be formed (or molded) separately from the concave mirror 42, and then fit into the scanner 10.

FIG. 18 is an exemplary diagram showing a modification of the reflecting mirror 42. In the example of FIG. 18, the reflecting mirror 42 is formed as a plane mirror, and as a reflection type hologram having a concentric circular pattern. Thus, a light beam coming from the polygon mirror 32 is reflected toward the first detector 42 (see FIG. 2). A transmission hologram having a concentric circular pattern is provided in the hole 42a bored in the reflecting mirror 42. Therefore, the operation and advantageous effects of the example shown in FIG. 18 are similar to the aforementioned embodiments of the present invention.

Figure 19:
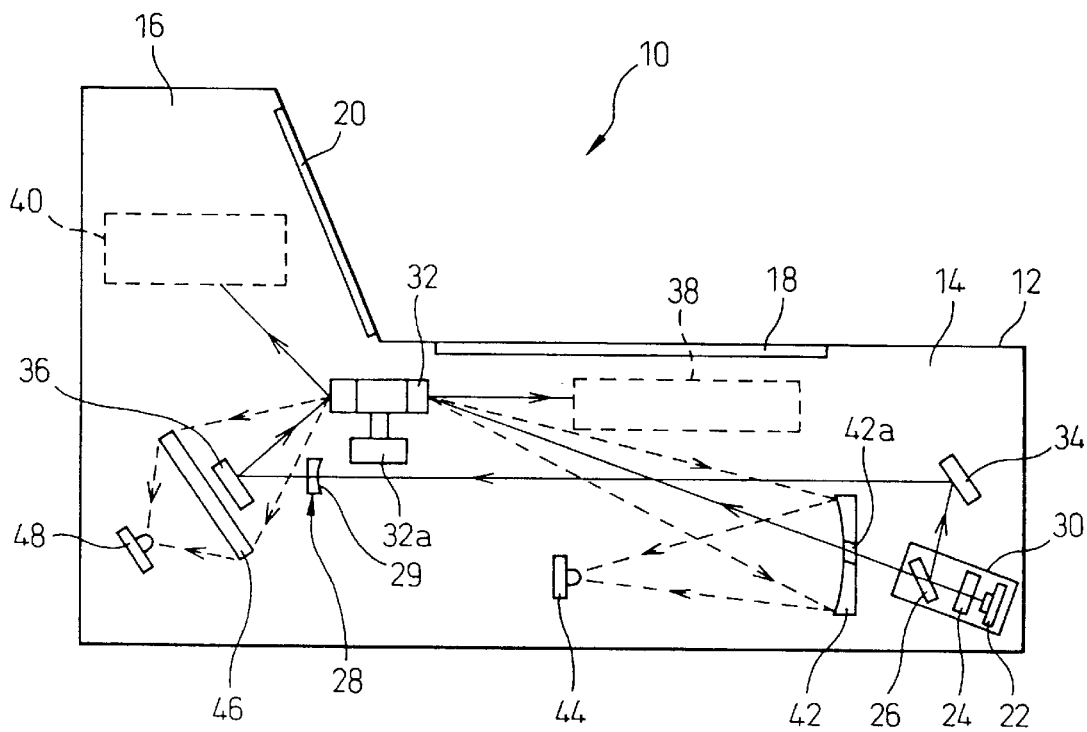
FIG. 19 is a cross-sectional diagram schematically illustrating the internal structure of another embodiment of the optical scanner embodying the present invention.

FIG. 19 is an exemplary diagram illustrating another embodiment of the present invention. The embodiment shown in FIG. 19 has a configuration similar to the aforementioned embodiment of the present invention, except that the second beam shaping device 28 is located in a different place than in the first embodiment. In the embodiment of FIG. 19, the second beam shaping device 28 is formed as a concave lens 29. The concave lens 29 is placed between the mirrors 34 and 36 and reflects a light beam emitted from the light source 22 and reflected by the light splitting member 26 before reaching the polygon mirror 32.

Figure 20:
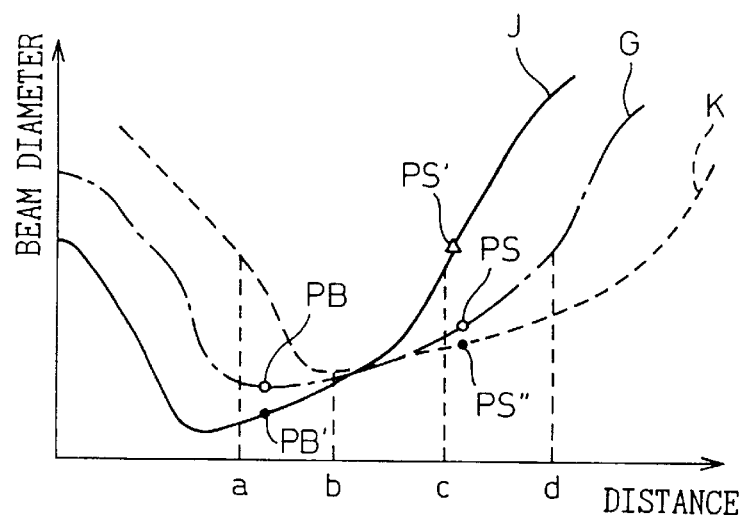
FIG. 20 is an exemplary graph illustrating the beam shaping performed by the first and second beam shaping device of FIG. 19.

FIG. 20 is an exemplary graph illustrating the effects of the first beam shaping device 24 and the second beam shaping device 28 depicted in FIG. 19. As in the example shown in FIG. 5, curve G represents characteristics which are the same as FIG. 4. Curve J represents the first beam shaping device 24 changed to decrease the beam diameter at the point PB. In order to change the characteristics represented by the curve G to those represented by the curve H, the distance between the light source 22 and the point S (at which the beam has a minimum beam diameter) must be decreased by changing the setting of the first beam shaping device 24 to reduce the focal length f of the collimator lens 50.

Additionally, a change in the characteristics from those represented by the curve G to those represented by the curve J can be achieved by changing the hole size of the aperture 52 or the distance between the light source 22 and the collimator lens 50. Consequently, the point PS on the curve G moves to the point PS' on the curve J. Thus the beam diameter of the light beam at the point PS is increased.

On the other hand, as a result of using concave lens 29, the beam diameter of the light beam at the point PS' is reduced to the beam diameter at the point PS". As shown in FIG. 20, the characteristics are changed from those represented by the curve J to those represented by the curve K. The concave lens 29 has the effect of increasing the distance from the light source 22 to the point S at which the light beam emitted from the light source 22 has a minimum beam diameter. Consequently, this (third) embodiment of the present invention obtains advantageous effects similar to those of the embodiment of the present invention illustrated in FIG. 2.

Figure 21:
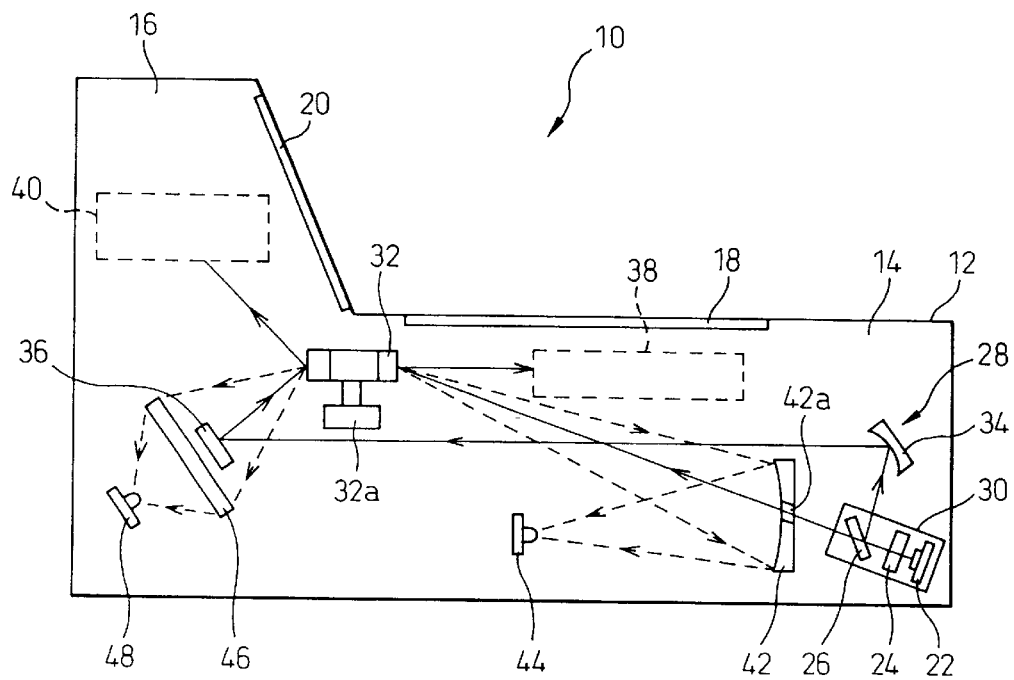
FIG. 21 is a cross-sectional diagram schematically illustrating the internal structure of another embodiment of the optical scanner embodying the present invention.

FIG. 21 is an exemplary diagram illustrating another embodiment of the present invention. The embodiment shown in FIG. 21 has a configuration similar to the aforementioned embodiment, except that the second beam shaping device 28 is located in a different place than that of the previously discussed embodiment. In this (fourth) embodiment of the present invention, shown in FIG. 21, the second beam shaping device 28 is formed as a mirror 34 reflecting a light beam emitted from the light source 22 and reflected by the light splitting member 26 to the mirror 34. Mirror 34 is formed as a concave mirror. Consequently, advantageous effects similar to those of FIG. 19 are attained by the present invention.

Figure 22:
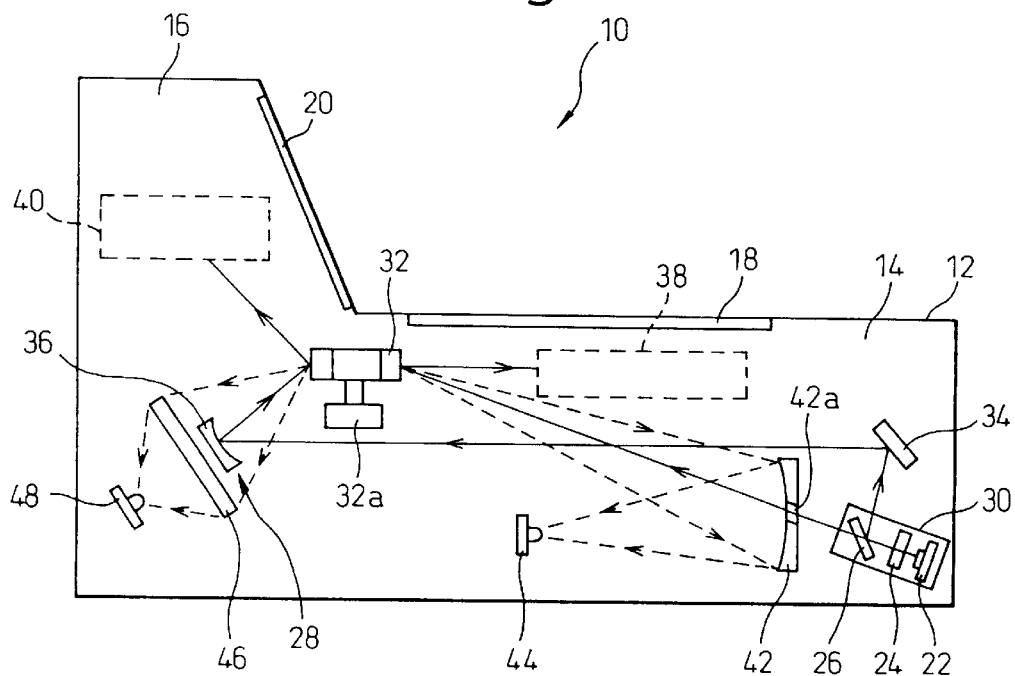
FIG. 22 is a cross-sectional diagram schematically illustrating the internal structure of another embodiment of the optical scanner embodying the present invention.

FIG. 22 is an exemplary diagram showing an embodiment of the present invention similar to the embodiment illustrated in FIG. 21. In the embodiment of the present invention shown in FIG. 22, the second beam shaping device 28 is formed as a mirror 36 reflecting a light beam emitted from the light source 22 then reflected by the light splitting member 26 to the polygon mirror 32 through the mirror 34. Consequently, advantageous effects similar to those of the embodiment of the present invention illustrated in FIG. 19 are obtained.

Figure 23:
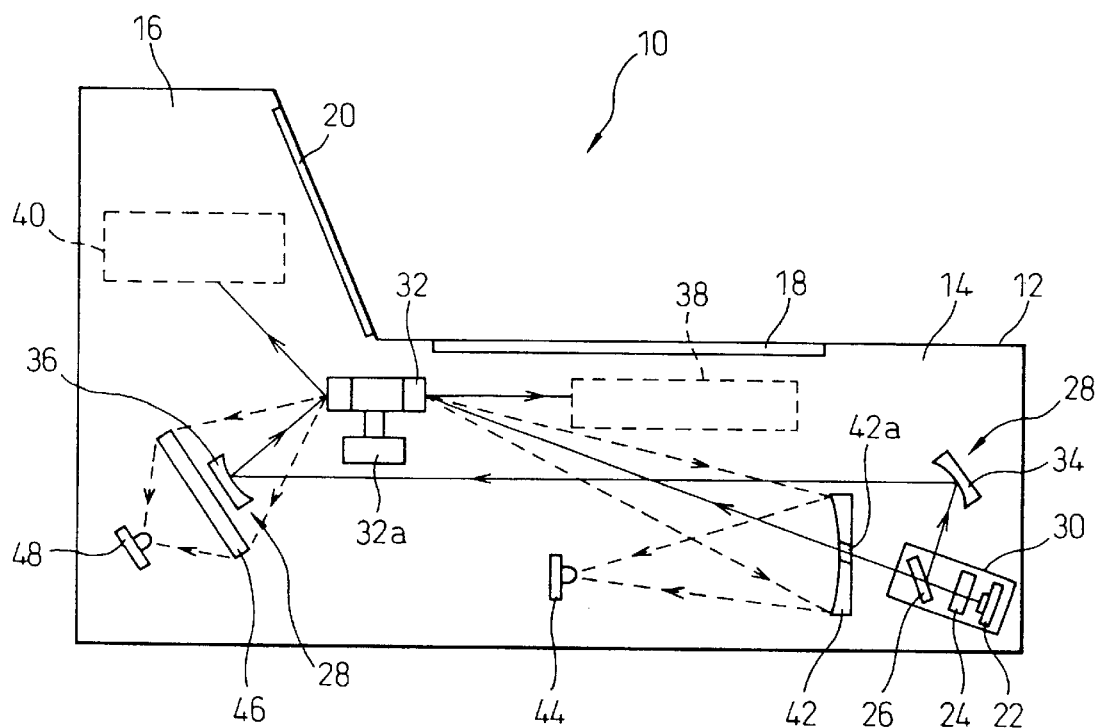
FIG. 23 is a cross-sectional diagram schematically illustrating the internal structure of another embodiment of the optical scanner embodying the present invention.

FIG. 23 is an exemplary diagram showing another embodiment of the present invention similar to that shown in FIG. 22. In the embodiment of the present invention shown in FIG. 23, the second beam shaping device 28 comprises the mirrors 34 and 36. One of the mirrors 34 and 36 is formed as a concave mirror, and the other is formed as a cylindrical lens. The mirror formed as a cylindrical lens, as described above with reference to FIGS. 8 and 9 are adapted to control the divergence angle of one of the light beams emitted from the laser light source 22, the divergence angles of which are different from one another.

Figure 24:
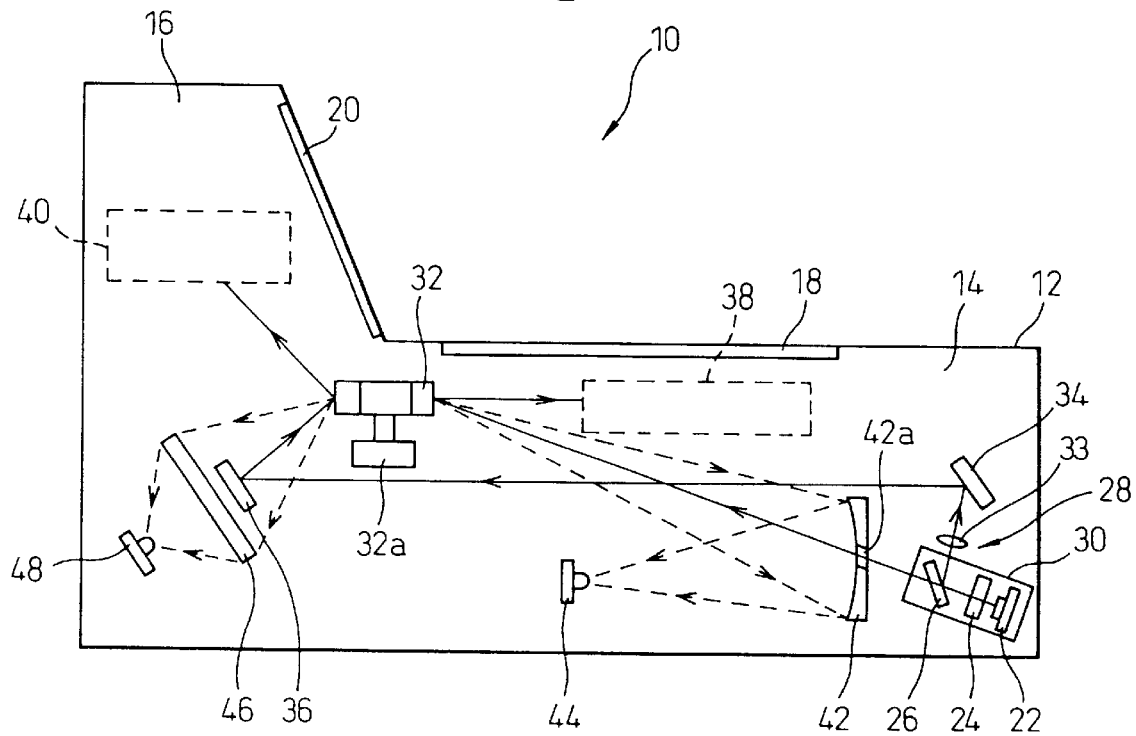
FIG. 24 is a cross-sectional diagram schematically illustrating the internal structure of another embodiment of the optical scanner embodying the present invention.

FIG. 24 is an exemplary diagram showing an embodiment of the present invention similar to the embodiment illustrated in FIG. 2. In the embodiment shown in FIG. 24, the second beam shaping device 28 is formed as a plano-convex lens 33, placed between the light splitting member 26 and the mirror 34. The operation and advantageous effects of this plano-convex lens 33 are the same as the plano-convex lens of FIG. 2, serving as the second beam shaping device 28. In contrast with the embodiment of FIG. 2, the embodiment of FIG. 24 is effective when the distance between the light source 22 and the bottom reading zone E is greater than the distance between the light source 22 and the side reading zone E.

Figure 25:
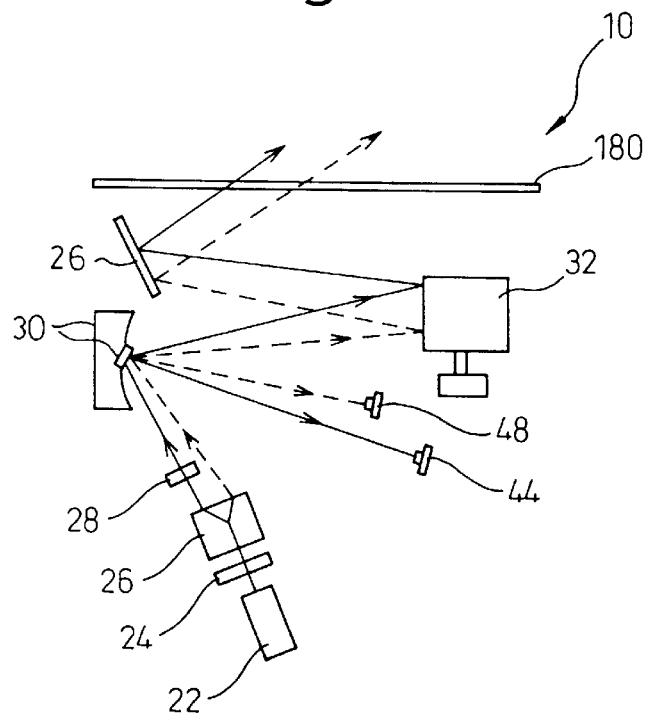
FIG. 25 is a cross-sectional diagram schematically showing another embodiment of the optical scanner embodying the present invention.

FIG. 25 is an exemplary diagram showing another embodiment of the present invention. In the case of the aforementioned embodiments of the present invention, the optical scanner 10 includes the bottom reading window 18, the side reading window 20, and the common light source 22 used for these reading windows. In contrast, in the embodiment of the present invention of FIG. 25, the optical scanner 10 includes a single reading window 180. Additionally, a light beam emitted from the common light source 22 is split into two light beam components by the light splitting member 26. An object is then scanned by the scanner 10 emitting the two light beam components from the reading window 180. The first beam shaping device 24 is located between the light source 22 and the light splitting member 26. The second beam shaping device 28 is located in one of the optical paths of the light beam components formed when the light beam is split by the light splitting device 26. The operation and advantageous effects of the first and second beam shaping devices 24 and 28 are similar to those of the aforementioned embodiments.

Figure 26A:
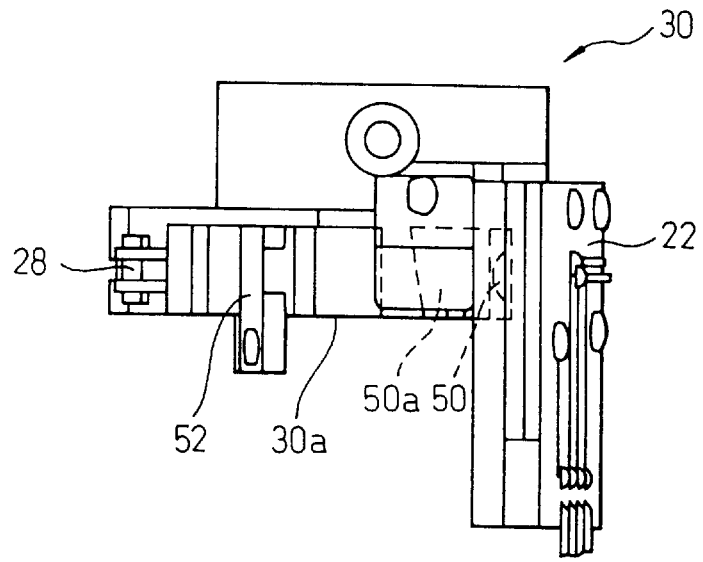
FIGS. 26(A)–(D) are exemplary diagrams showing a light source module.
Figure 26B:
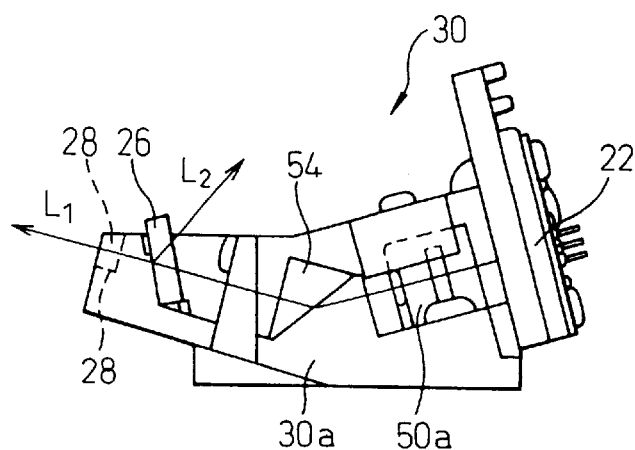
Figure 26C:
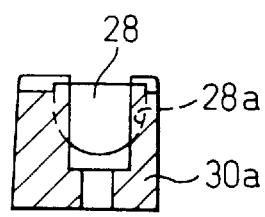
Figure 26D:
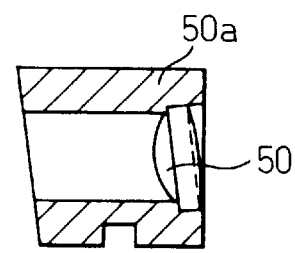
Figure 27:
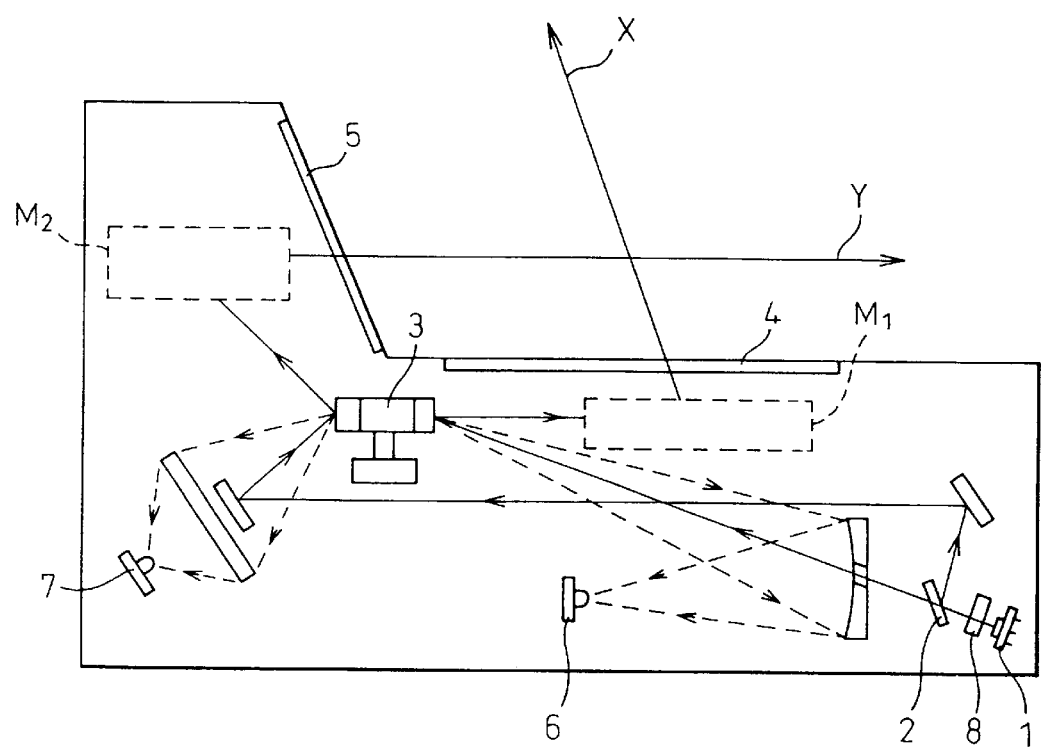
FIG. 27 is a diagram showing a prior art optical scanner.

FIGS. 26(A) and 26(B) are exemplary diagrams illustrating a light source module 30 including a right-angle prism. FIG. 26(A) is a plan view of the light source module 30, and FIG. 26(B) is a vertical cross-sectional diagram schematically illustrating the light source module 30. The light source module 30 includes a body 30a to which the light source 22 is attached. The collimator lens 50 of the first beam shaping device 24, the right-angle prism 54, the aperture 52 of the first beam shaping device 24, the light splitting means (half mirror) 26, and the second beam shaping device 28 are located in the body 30a of the light source module 30. The collimator lens 50 is attached to an aluminum block 50a and is then inserted into a hole bored in an end part of the body 30a, as shown in FIG. 26(D). A lens serving as the second beam shaping device 28 is inserted into a hole bored in the other end part of the body 30a, as shown in FIG. 26(C). The lens acting as the second beam shaping device 28 is shaped nearly like a semi-circle. The shape of a mounting hole 28a, which is a groove having a U-shaped section, is matched with that of the same lens.

As described above, in accordance with the present invention, the beam diameters of the two light beam components which are emitted from a common light source and split by an optical beam splitter are minimized.

The many features and advantages of the invention are apparent from the detailed specification and, thus, it is intended by the appended claims to cover all such features and advantages of the invention which fall within the true spirit and scope of the invention. Further, since numerous modifications and changes will readily occur to those skilled in the art, it is not desired to limit the invention to the exact construction and operation illustrated and described, and accordingly all suitable modifications and equivalents may be resorted to, falling within the scope of the invention.

What is claimed is:

1. An optical scanner, comprising:

a body;

at least one reading window provided in the body;

a light source;

light splitting means for splitting a light beam emitted from the light source into a first optical path light beam component and a second optical path light beam component;

light scan means for allowing the first light beam component and the second light beam component split by the light splitting means to be emitted from the at least one reading window;

a first focusing element to focus light corresponding to the first light beam component emitted by the light scan means, to a first light detector;

a second focusing element to focus light corresponding to the second light beam component emitted by the light scan means, to a second light detector;

beam shaper placed between the light source and the light splitting means; and beam focal position shaper placed in one of the first and second optical paths to adjust a focal position of the corresponding first or second light beam components.

2. An optical scanner, comprising:

a body;

a first reading window provided in the body;

a second reading window provided in the body at an angle with respect to the first reading window;

a light source;

light splitting means for splitting a light beam emitted from the light source into a first optical path light beam component and a second optical path light beam component;

light scan means for allowing the first light beam component and the second light beam component split by the light splitting means to be emitted from the first reading window and the second reading window;

a first focusing element to focus light corresponding to the first light beam component emitted by the light scan means, to a first light detector;

a second focusing element to focus light corresponding to the second light beam component emitted by the light scan means, to a second light detector;

beam shaper placed between the light source and the light splitting means; and beam focal position shaper placed in one of the first and second optical paths to adjust a focal position of the corresponding first or second light beam components.

3. The optical scanner according to claim 1, wherein the beam shaper is adapted to perform beam shaping so that a light beam emitted from the light source has a minimum beam diameter at a first distance from the light source, and the beam focal position shaper is adapted to perform beam shaping so that one of the first or second light beam components has a minimum beam diameter at a second distance from the light source, which is different than the first distance.

4. The optical scanner according to claim 3, wherein the beam shaper comprises a collimator lens and an aperture.

5. The optical scanner according to claim 4, wherein the beam focal position shaper comprises a convex lens whose focal length is greater than that of the collimator lens.

6. The optical scanner according to claim 3, wherein the beam focal position shaper comprises a concave lens.

7. The optical scanner according to claim 3, wherein the beam focal position shaper comprises a concave mirror.

8. The optical scanner according to claim 1, wherein the light source, the light splitting means, and the beam shaper are incorporated into a light source module as one unit.

9. The optical scanner according to claim 1, wherein the light source, the light splitting means, the beam shaper, and the beam focal position shaper are incorporated into a light source module as one unit.

10. A light source module, comprising:

a light source;

beam shaper for shaping a light beam emitted from the light source;

a light splitter splitting the light beam, which is emitted from the light source into a first optical path light beam and a second optical path light beam; and beam focal position shaper placed in one of the first and second optical paths to adjust a focal position of the corresponding first or second light beams.

11. An apparatus to scan an object having a bar code attached thereto, comprising:

a light source emitting a light beam;

a light beam splitting device splitting the beam of light emitted from the light source into a first optical path light beam component and a second optical path light beam component;

a first reading window and a second reading window, each reading window emitting respective light beam components to impinge on and be reflected by the object and receiving the reflected light from the object;

a light scan device directing the first light beam component and second light beam component through the first reading window and the second reading window, respectively, such that the first light beam component crosses paths with the second light beam component at an optimum reading position;

a first focusing element to focus light corresponding to the first light beam component directed by the light scan device, to a first light detector;

a second focusing element to focus light corresponding to the second light beam component directed by the light scan device, to a second light detector;

a beam shaping device, located between the light source and the light beam splitting device, minimizing the beam diameter of the first light beam component at the optimum reading position; and a beam focal position shaping device, located in one of the first and second optical paths, minimizing the beam diameter of the second light beam component at the optimum reading position by adjusting a focal position of the second light beam component.

12. The apparatus according to claim 11, wherein:

the first light detector detects the light corresponding to the first beam component after having been reflected back from the object, and the second light detector detects the light corresponding to the second beam component after having been reflected back from the object.

13. A method for scanning an object using an optical scanner, comprising the steps of:

splitting a light beam emitted from a light source into a first optical path light beam component and a second optical path light beam component;

scanning the first beam component and the second beam component to a first reading window and a second reading window, respectively, and emitting the first beam component and the second beam component therefrom such that the paths of the first and second light beam components which are emitted from the first and second reading windows, respectively, cross at an optimal reading position;

shaping the light beam to minimize the diameter of one of the light beam components at the optimal reading position, and shaping the other of the light beam components to minimize the diameter of the other of the light beam components at the optimal reading position by adjusting a focal position of the other light beam component; and detecting the object with first and second light detecting elements after the first and second light beam components have been reflected from the object and focused by first and second focusing elements, respectively.

14. An optical scanner, comprising:

a body;

at least one reading window provided in the body;

a light source provided in the body;

a light splitting device splitting a light beam emitted from the light source into a first optical path light beam component and a second optical path light beam component;

a light scan device allowing the first light beam component and the second light beam component split by the light splitting device to be emitted from the at least one reading window;

a first focusing element to focus light corresponding to the first light beam component emitted by the light scan device, to a first light detector;

a second focusing element to focus light corresponding to the second light beam component emitted by the light scan device, to a second light detector;

a beam shaping device placed between the light source and the light splitting device; and a beam focal position shaping device placed in one of the first and second optical paths to adjust the focal position of the corresponding first or second light beam components.

15. An optical scanner comprising:

a body;

a first reading window provided in the body;

a second reading window provided in the body at an angle with respect to the first reading window;

a light source;

a light splitting device splitting a light beam emitted from the light source into a first optical path light beam component and a second optical path light beam component;

a light scan device allowing the first light beam component and the second light beam component split by the light splitting device to be emitted from the first reading window and the second reading window;

a first focusing element to focus light corresponding to the first light beam component emitted by the light scan device, to a first light detector;

a second focusing element to focus light corresponding to the second light beam component emitted by the light scan device, to a second light detector;

a beam shaping device placed between the light source and the light splitting device; and a beam focal position shaping device placed in one of the first and second optical paths to adjust a focal position of the corresponding first or second light beam components.

16. A light source module, comprising:

a light source;

a beam shaping device shaping a light beam emitted from the light source;

a light splitting device splitting the light beam, which is emitted from the light source into a first optical path light beam and a second optical path light beam; and a beam focal position shaping device placed in one of the first and second optical paths to adjust a focal position of the corresponding first or second light beam components.

17. An optical scanner comprising:

a light source generating a light beam;

a beam splitter splitting the light beam into light beam components;

beam shaping devices shaping each of the light beam components;

mirrors directing the light beam components to an optimal reading zone, wherein the beam shaping devices shape the light beam components to minimize the respective beam diameters at the optimal reading zone by controlling a focal position of the respective beam components;

a first focusing element to focus light corresponding to one of the light beam components directed by the mirrors, to a first light detector; and a second focusing element to focus light corresponding to an other one of the light beam components directed by the mirrors, to a second light detector.

18. An optical scanner comprising:

a light source module emitting light beam components of a light beam, said light beam components being shaped to minimize the beam diameters of the respective light beam components at an optimal reading zone by controlling a focal position of the respective light beam components;

mirrors directing the shaped light beam components to the optimal reading zone;

a first focusing element to focus light corresponding to one of the shaped light beam components directed by the mirrors, to a first light detector; and a second focusing element to focus light corresponding to an other one of the shaped light beam components directed by the mirrors, to a second light detector.

19. The optical scanner according to claim 14, wherein the beam shaping device is adapted to perform beam shaping so that a light beam emitted from the light source has a minimum beam diameter at a first distance from the light source, and the beam focal position shaping device is adapted to perform beam shaping so that the one of the first or second light beam components has a minimum beam diameter at a second distance from the light source, which is different than the first distance.

20. The optical scanner according to claim 19, wherein the beam shaping device comprises a collimator lens and an aperture.

21. The optical scanner according to claim 20, wherein the beam focal position shaping device comprises a convex lens whose focal length is greater than that of the collimator lens.

22. The optical scanner according to claim 19, wherein the beam focal position shaping device comprises a concave lens.

23. The optical scanner according to claim 19, wherein the beam focal position shaping device comprises a concave mirror.

24. The optical scanner according to claim 14, wherein the light source, the light splitting device, and the beam shaping device are formed as one unit.

25. The optical scanner according to claim 14, wherein the light source, the light splitting device, the beam shaping device, and the beam focal position shaping device are formed as one unit.

26. A light source module, comprising:

a light source;

beam shaper for shaping a light beam emitted from the light source;

a light splitter splitting a light beam, which is emitted from the light source into a first optical path light beam and a second optical path light beam; and beam focal position shaper placed in one of the first and second optical paths, wherein the beam shaper shapes a cross-sectional shape of one of the light beams and the beam focal position shaper changes a focal distance of the other light beam.

27. A light source module, comprising:

a light source;

a light splitting device splitting a light beam, which is emitted from the light source, into a first optical path light beam and a second optical path light beam; and a beam shaping device, placed in one of the first and second optical paths, changing a focal position of one of the first and second light beams to a position in front of or beyond a focal position of the other one of the first and second light beams.

28. An optical scanner, comprising:

a body;

at least one reading window provided in the body;

a light source module, including:

a light source;

a beam shaper to shape a light beam emitted from the light source;

a light splitter to split the light beam emitted from the light source into a first optical path light beam component, and a second optical path light beam component; and a beam focal position shaper placed in one of the first and second optical paths to adjust a focal position of the corresponding first or second light beam components;

a group of mirrors to transmit at least one of the first light beam component and the second light beam component through said at least one reading window;

a first focusing element to focus light corresponding to the first light beam component split by the light splitter of the light source module, to a first light detector; and a second focusing element to focus light corresponding to the second light beam component split by the light splitter of the light source module, to a second light detector.

* * * * *

UNITED STATES PATENT AND TRADEMARK OFFICE
CERTIFICATE OF CORRECTION

PATENT NO.     : 6,469,294 B2
DATED          : October 22, 2002
INVENTOR(S)    : Masanori Ohkawa et al.

It is certified that error appears in the above-identified patent and that said Letters Patent is hereby corrected as shown below:

<u>Title page,</u>
Item [56], References Cited, U.S. PATENT DOCUMENTS, please insert
-- 5,646,391     07/1997     Forbes --.

Signed and Sealed this

Twenty-seventh Day of May, 2003

JAMES E. ROGAN
*Director of the United States Patent and Trademark Office*